United States Patent
Kurnianto

(10) Patent No.: US 12,196,774 B2
(45) Date of Patent: Jan. 14, 2025

(54) POSITIVE DISPLACEMENT PIPETTE TIP FOR MOTORIZED CONTROL AUTOMATION OR INSTRUMENT SYSTEM

(71) Applicant: Formulatrix, Inc., Bedford, MA (US)

(72) Inventor: Daniel Kurnianto, Bedford, MA (US)

(73) Assignee: Formulatrix International Holding Ltd., Dubai (AE)

( * ) Notice: Subject to any disclaimer, the term of this patent is extended or adjusted under 35 U.S.C. 154(b) by 646 days.

(21) Appl. No.: 17/426,235

(22) PCT Filed: Dec. 31, 2019

(86) PCT No.: PCT/US2019/069081
§ 371 (c)(1),
(2) Date: Jul. 28, 2021

(87) PCT Pub. No.: WO2020/159658
PCT Pub. Date: Aug. 6, 2020

(65) Prior Publication Data
US 2022/0099693 A1    Mar. 31, 2022

Related U.S. Application Data

(60) Provisional application No. 62/797,688, filed on Jan. 28, 2019.

(51) Int. Cl.
*G01N 35/10* (2006.01)
*B01L 3/02* (2006.01)

(52) U.S. Cl.
CPC ........ *G01N 35/1016* (2013.01); *B01L 3/0275* (2013.01); *B01L 2200/0689* (2013.01);
(Continued)

(58) Field of Classification Search
CPC ....... B01L 2200/0689; B01L 2200/141; B01L 2300/12; B01L 2400/0478;
(Continued)

(56) References Cited

U.S. PATENT DOCUMENTS

| 4,362,063 A | 12/1982 | Marteau d Autry |
| 4,830,832 A | 5/1989 | Arpagaus et al. |

(Continued)

FOREIGN PATENT DOCUMENTS

| EP | 0078724 A1 | 8/1985 |
| JP | S5716332 A | 1/1982 |

(Continued)

OTHER PUBLICATIONS

Auszug aus dem Katalog „Produkte und Applikationen fur das Labor 2000—Eppendorf—Biomaster® 4830/ Mastertip® (Vorderseite, Seite 13, Ruckseite).

(Continued)

*Primary Examiner* — Jennifer Wecker
(74) *Attorney, Agent, or Firm* — E. Eric Mills; Todd A. Serbin; Maynard Nexsen PC

(57) ABSTRACT

A positive displacement pipette tip for motorized control automation or liquid handling instrument system is disclosed. The positive displacement pipette tip includes a pipette tip and a pipette plunger. An interface portion of the pipette tip of the positive displacement pipette tip is designed to be used in combination with a zero-insertion force pipette tip clamping mechanism in, for example, a liquid handling instrument. Further, the pipette plunger of the positive displacement pipette tip is designed to be used in combination with a zero-insertion force pipette plunger clamping mechanism in, for example, a liquid handling instrument.

27 Claims, 23 Drawing Sheets

(52) U.S. Cl.
CPC ..... *B01L 2200/141* (2013.01); *B01L 2300/12* (2013.01); *B01L 2400/0487* (2013.01)

(58) Field of Classification Search
CPC ........... B01L 2400/0487; B01L 3/0217; B01L 3/022; B01L 3/0275; B01L 3/0279; G01F 11/029; G01N 35/10; G01N 35/1016
See application file for complete search history.

(56) References Cited

U.S. PATENT DOCUMENTS

| | | | |
|---|---|---|---|
| 4,967,604 | A | 11/1990 | Arpagaus et al. |
| 5,192,511 | A | 3/1993 | Roach |
| 6,197,259 | B1 | 3/2001 | Kelly et al. |
| 9,156,030 | B2 * | 10/2015 | Beese ................. B01L 3/0279 |
| 2002/0123156 | A1 | 9/2002 | Tajima |
| 2004/0208793 | A1 * | 10/2004 | Jarvimaki ............. B01L 3/0217 |
| | | | 422/500 |
| 2009/0191097 | A1 | 7/2009 | Hanafusa et al. |
| 2010/0043575 | A1 | 2/2010 | Tajima |
| 2013/0078625 | A1 * | 3/2013 | Holmes ............. G01N 35/0092 |
| | | | 204/601 |
| 2015/0038904 | A1 | 2/2015 | Denton et al. |
| 2016/0271602 | A1 | 9/2016 | Voyeux et al. |
| 2017/0361323 | A1 | 12/2017 | Guzman et al. |

FOREIGN PATENT DOCUMENTS

| | | |
|---|---|---|
| JP | S62191049 A | 8/1987 |
| JP | 2007322291 A | 12/2007 |
| JP | 2013136052 A | 7/2013 |

OTHER PUBLICATIONS

Auszug aus dem Katalog der „Eppendorf—Katalog 2016—Liquid Handling, Sample Handling, Cell Handling—Biomaster® 4830 (Vorderseite, Seiten 2-4, Seite 74, Ruckseite).
Bedienungsanleitung: „Eppendorf Biomaster® 4830 Operating Manual.
Fotos eines archivierten Ruckstellmusters „20 µl, Mastertips/Pos. Displacement—Tips, Order No. 0030 001.320.
Technische Zeichnung „Mastertip-Kolben, Zeichnungsnummer 0030 000.331-01 vom 30. Jan. 1997.
Rechnung Nr. 92324305 der Eppendorf Vertrieb Deutsch land GmbH an Deutsches Herzzentrum Munchen vom Nov. 11, 2017.
Rechnung Nr. 2860003556 der Eppendorf Poland Sp. Zo.o. an Parens Centrum Leczenia Nieplodnosci vom Sep. 7, 2015.
Rechnung Nr. 92049136 der Eppendorf Vertrieb Deutsch land GmbH an Spezialklinik Neukirchen vom Dec. 8, 2016.
Produktionsstucklisten—Fertigungsartikel 0030 001.320-09—Bezeichnun•:r 480 Mastertips 20 µl vom Nov. 21, 2024.

* cited by examiner (TOP)

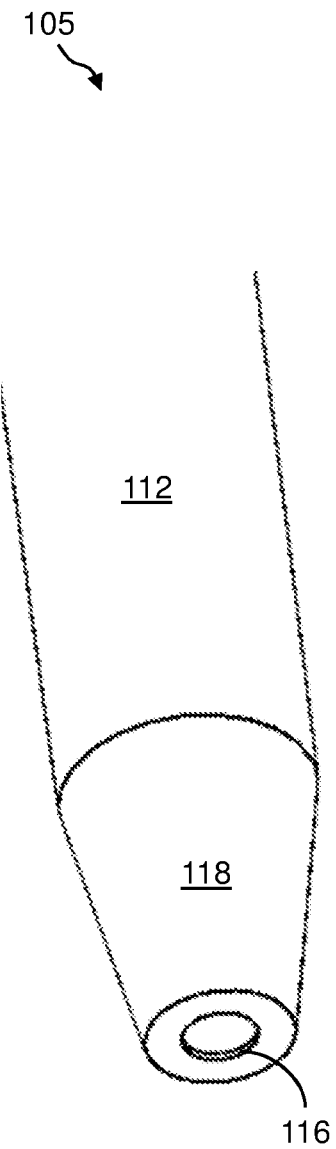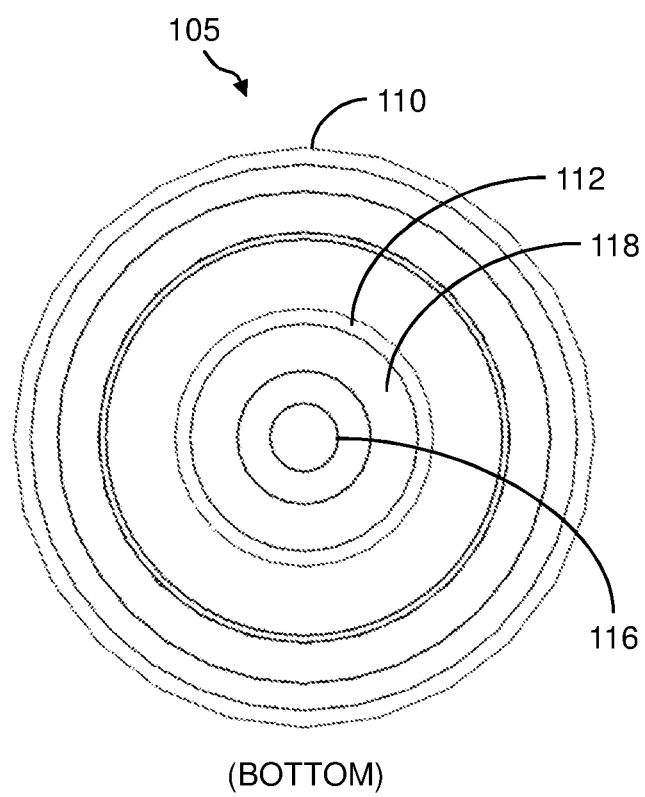
FIG. 6A
FIG. 6B
(BOTTOM)

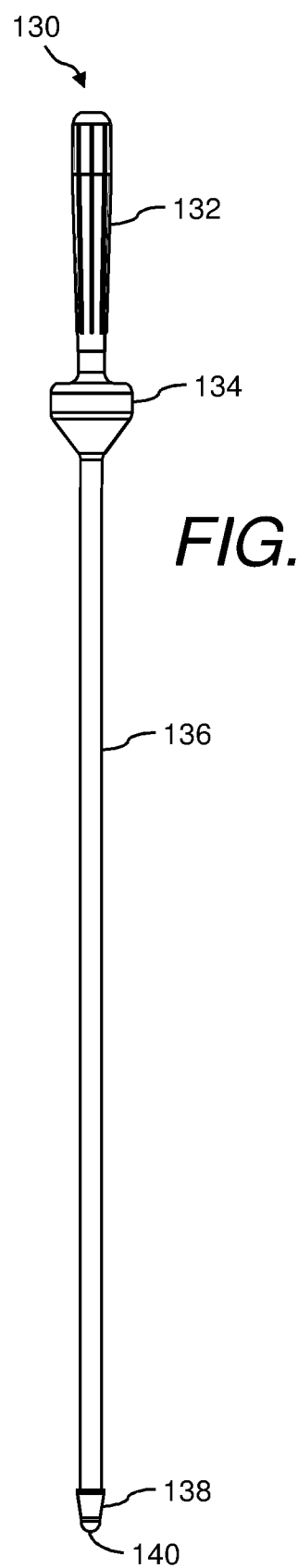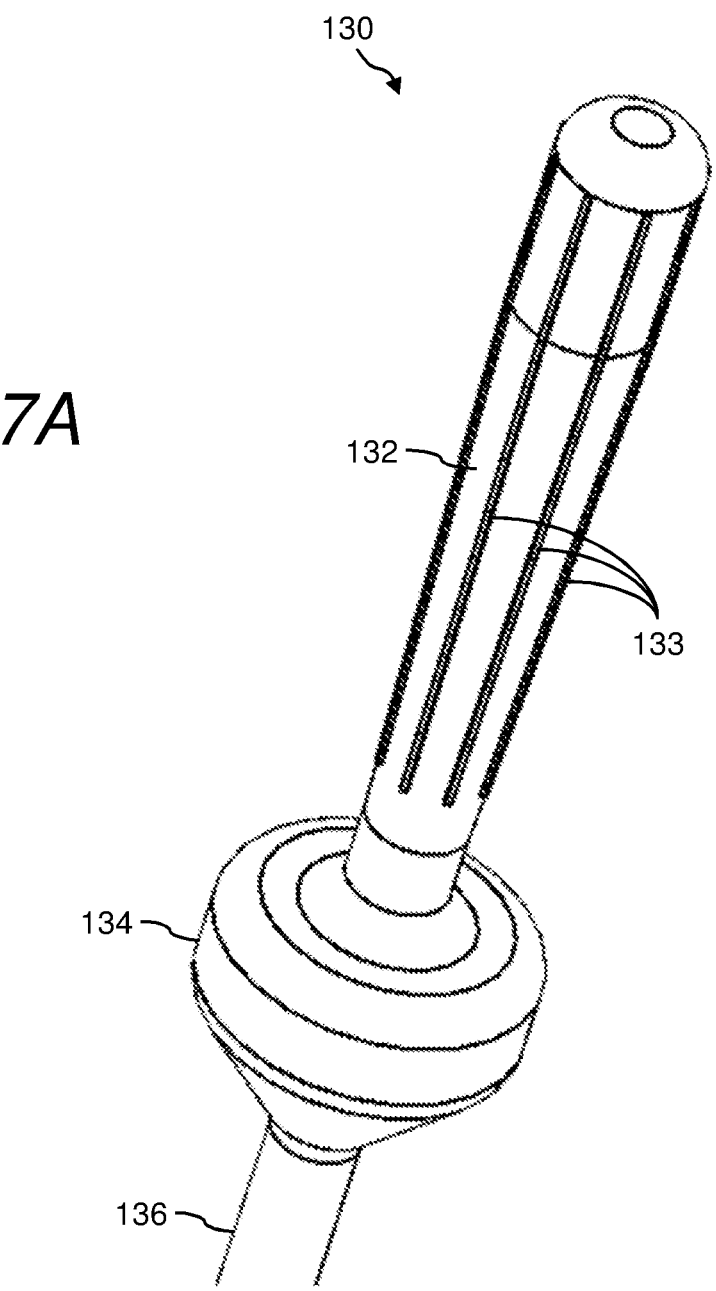
FIG. 7A
FIG. 7B (TOP)

(BOTTOM)

POSITIVE DISPLACEMENT PIPETTE TIP FOR MOTORIZED CONTROL AUTOMATION OR INSTRUMENT SYSTEM

CROSS REFERENCE TO RELATED APPLICATIONS

This application is a 35 U.S.C. § 371 U.S. national phase entry of International Application No. PCT/US2019/069081 having an international filing date of Dec. 31, 2019, which claims benefit of U.S. Application No. 62/797,688 filed Jan. 28, 2019; each of which is incorporated herein by reference in its entirety.

TECHNICAL FIELD

The presently disclosed subject matter relates generally to liquid handling methods and more particularly to a positive displacement pipette tip for motorized control automation or liquid handling instrument system.

BACKGROUND

Automated liquid handling instruments include robots used to transfer specific quantities of liquids, such as reagents or samples, between designated containers. Liquid handling instruments are useful in a variety of applications including cell biology, genomics, forensics, and drug research. The instruments assist humans with the repetitive task of transferring liquids in a wide range of volumes to improve speed and efficiency of the operations, as well as precision and accuracy of the delivered volumes. The advantages of automating liquid handling processes include increasing throughput and efficiency of operations and eliminating human errors.

In conventional liquid handling instruments there is typically a sealed interface between the instrument and each of the pipette tips. The sealed interface is usually a compressible rubber O-ring that requires regular maintenance and/or replacement over the lifetime of the instrument. The compressible rubber O-ring also has the disadvantage of having high friction during pipette tip insertion, which ends up requiring (1) a powerful actuator to achieve the required downward force, and (2) a strong/heavy mechanical structure to handle the high friction from multiple O-rings to perform reliable sealing interface for multiple pipette tips (e.g., 96 pipette tips used with a 96-well sample plate). For example, in conventional liquid handling instruments, one pipette tip may require about 100 grams of insertion force and therefore the actuator for that tip must provide about 100 grams of downward force. Therefore, in a multi-channel liquid handling instrument that processes, for example, 96 pipette tips, the actuator must be capable of about 9.5 kilograms of downward force. Accordingly, a powerful actuator is required that has a strong/heavy mechanical support structure that can handle the high force.

Other drawbacks of conventional liquid handling instruments may include, but are not limited to, (1) the presence of air displacement pipette tips that have a shared air column between all of the pipette tip interfaces, which can be a common source of contamination that can carry over to the next workflow; (2) air displacement pipette tips that are dedicated to a certain liquid class range; and (3) air displacement pipette tips that have certain air compression and expansion properties.

SUMMARY

The presently described subject matter includes a positive displacement pipette tip and liquid handling system using pipette tips. In one embodiment, the pipette tip may have an interface portion and a pipette tip body, the interface portion may have an inner wall and a receptacle, the pipette tip body may have a fluid channel along the length of the pipette tip body, and the fluid channel may have an opening at the distal end of the fluid channel, The pipette tip may further have a pipette plunger positioned along the inside of the pipette tip, the pipette plunger may have a plunger upper portion, a plunger centering portion, and a plunger tip having a distal tip portion. In one embodiment, the receptacle of the interface portion may be adapted to receive the plunger centering portion, and the fluid channel may be adapted to receive the distal tip portion of the plunger tip.

In another embodiment, the fluid channel may have a tapered tip at the distal end of the fluid channel. The distal tip portion of the pipette plunger may have a rounded portion adapted to mate with the opening and the tapered tip at the distal end of the fluid channel.

In still another embodiment, the distal tip portion may have tapered sidewalls corresponding to the tapered tip of the fluid channel. In still another embodiment, the distal tip portion may have an outer upper edge sized to slideably seal against and along the walls of the fluid channel sufficient to minimize the void between the tapered tip of the fluid channel and the tapered sidewalls of the distal tip portion.

In still another embodiment, the outer upper edge has a sealing ring feature formed thereon. The pipette tip may be formed of a polymeric material. The pipette plunger may be formed of the same or a different polymeric material than the pipette tip.

In yet another embodiment, the inner wall of the interface portion includes vertical inner wall features. In one embodiment, each of the vertical inner wall features is a raised or protruding vertical line formed along the inner wall of the interface portion.

The plunger upper portion may also have an outer wall, the outer wall including vertical outer wall features. In one embodiment, each of the vertical outer wall features may be a raised or protruding vertical line formed along the outer wall of the plunger upper portion.

In one embodiment, the interface portion may have an upper rim with a set of spacer features.

The present subject matter further describes a liquid handling system. In one embodiment, the liquid handling system includes a pipette tip having an interface portion and a pipette tip body, the interface portion may have an inner wall and a receptacle, the pipette tip body may have a fluid channel along the length of the pipette tip body, and the fluid channel may have an opening at the distal end of the fluid channel.

The liquid handling system may further include a pipette plunger positioned along the inside of the pipette tip, the pipette plunger may have a plunger upper portion, a plunger centering portion, and a plunger tip having a distal tip portion, wherein the receptacle may be adapted to receive the plunger centering portion, and wherein the fluid channel may be adapted to receive the distal tip portion of the plunger tip.

The liquid handling system may further include a zero-insertion force pipette tip clamping mechanism adapted to manipulate the pipette tip and pipette plunger.

In one embodiment, the zero-insertion force pipette clamping mechanism may include a pipette tip collet and a pipette tip lock mechanism.

The pipette tip collet may include a pipette tip collet upper ring plate and collet chuck portion for fitting inside the interface portion of the pipette tip. In one embodiment, the collet chuck portion may have a serrated feature adapted to increase the friction to the interface portion of the pipette tip.

In another embodiment, the collet chuck portion may be a segmented band or sleeve for fitting inside the interface portion.

In still another embodiment, the collet chuck portion may be adapted to expand and lock against the inner wall of the interface portion.

In yet another embodiment, the pipette tip lock mechanism may include a pipette tip lock upper ring plate and a hollow sleeve portion for fitting inside the collet chuck portion.

In still another embodiment, the collet chuck portion may be adapted to expand against the inside wall of the interface portion when the hollow sleeve portion is fitted inside the collet chuck portion of the pipette tip collet, and wherein the collet chuck portion may be adapted to retract and become loose with respect to the interface portion when the hollow sleeve portion is withdrawn from the collet chuck portion of the pipette tip collet.

The liquid handling system may further include a zero-insertion force pipette clamping mechanism having a pipette plunger collet and a pipette plunger lock mechanism.

In one embodiment, the pipette plunger collet may have a shaft portion and a collet chuck portion for fitting around the plunger upper portion of the pipette plunger.

In another embodiment, the collet chuck portion may be a segmented band or sleeve for fitting around the plunger upper portion of the pipette plunger, the collet chuck portion may be adapted to expand and lock against the outside wall of the plunger upper portion that is inside the collet chuck portion.

In yet another embodiment, the pipette plunger lock mechanism may include an upper ring plate and a hollow sleeve portion for fitting around the plunger collet. The collet chuck portion may be adapted to be closed against the plunger upper portion of the pipette plunger when the hollow sleeve portion is slid around the collet chuck portion of the plunger collet, and wherein the collect chuck portion may be adapted to release the plunger upper portion of the pipette plunger when the hollow sleeve portion is withdrawn from the collet chuck portion of the plunger collet.

In still another embodiment, the zero-insertion force pipette clamping mechanism may include a pair of pipette plunger clamping mechanisms, a pair pipette plunger collets, a fixed upper plate, a lower plate, and two springs between the upper plate and the lower plate, wherein the upper ends of the pipette plunger collets may be held fixed to the upper plate, wherein the lower plate and two springs may be movable with respect to the upper plate, and wherein each spring may be adapted to provide spring force to a corresponding pipette plunger lock mechanism that passes in slidable fashion through the lower plate, the pipette plunger lock mechanisms may be moveable with respect to the plunger collets.

BRIEF DESCRIPTION OF DRAWINGS

Figure 1A:
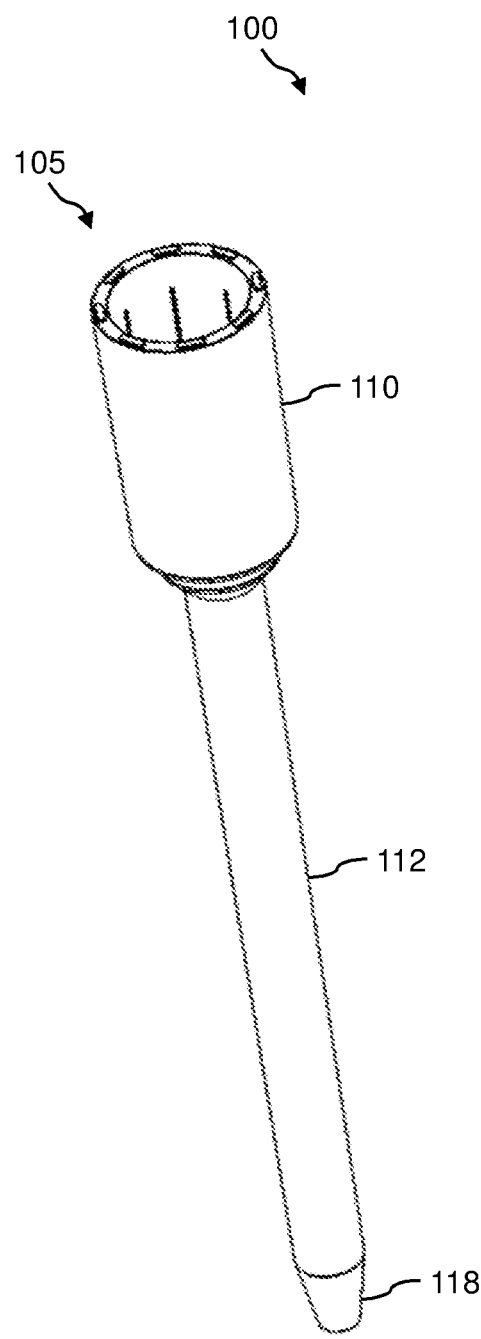
Figure 1B:
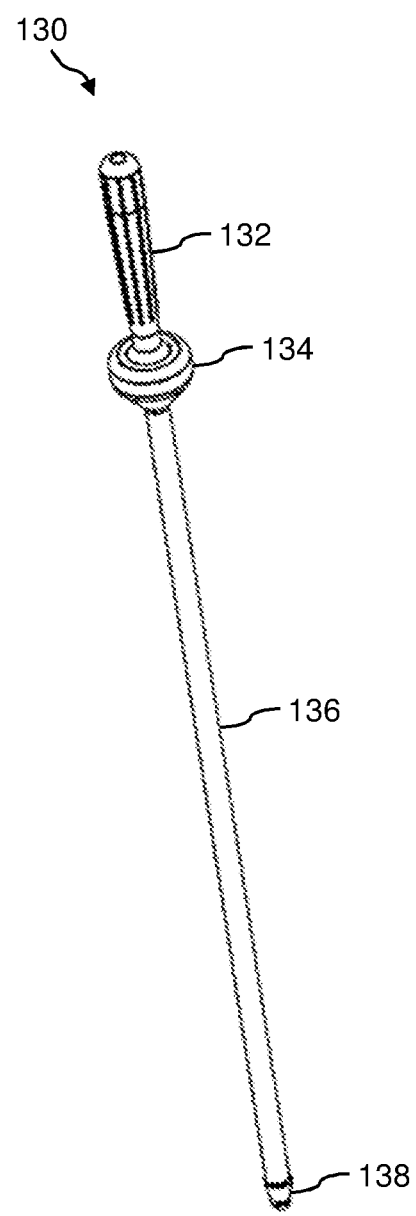
Figure 2:
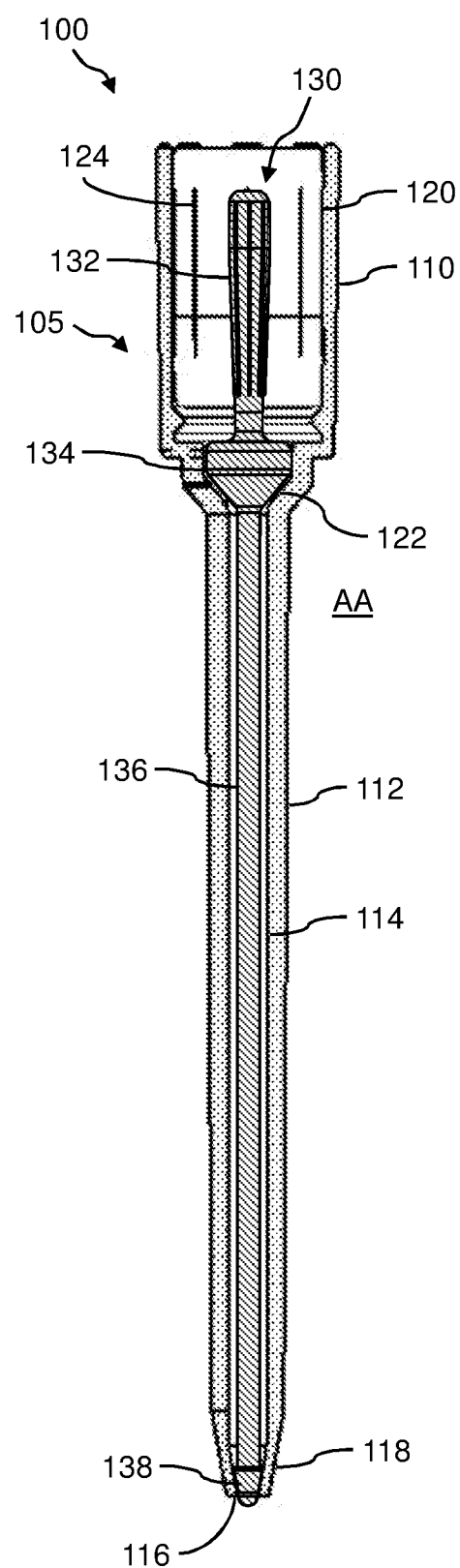
Figure 3:
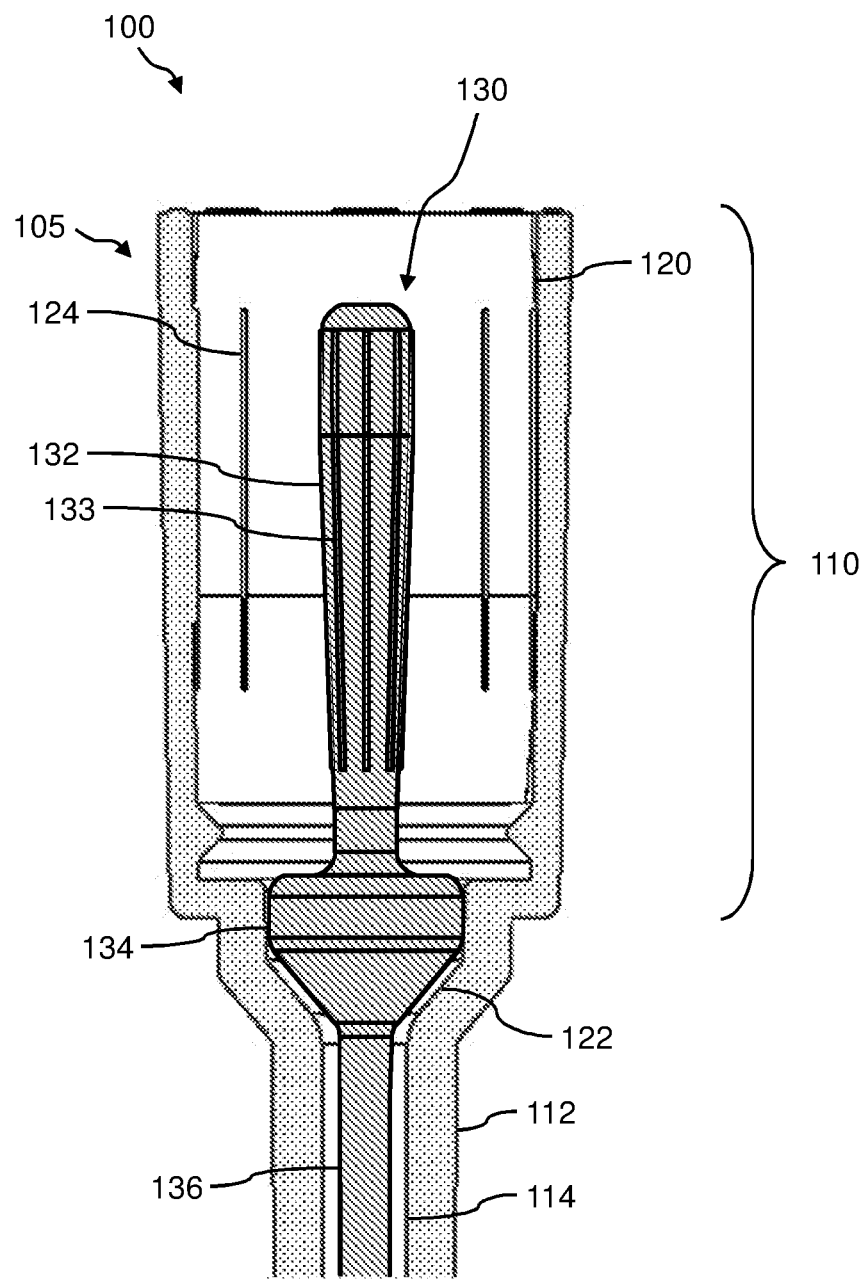
Figure 4A:
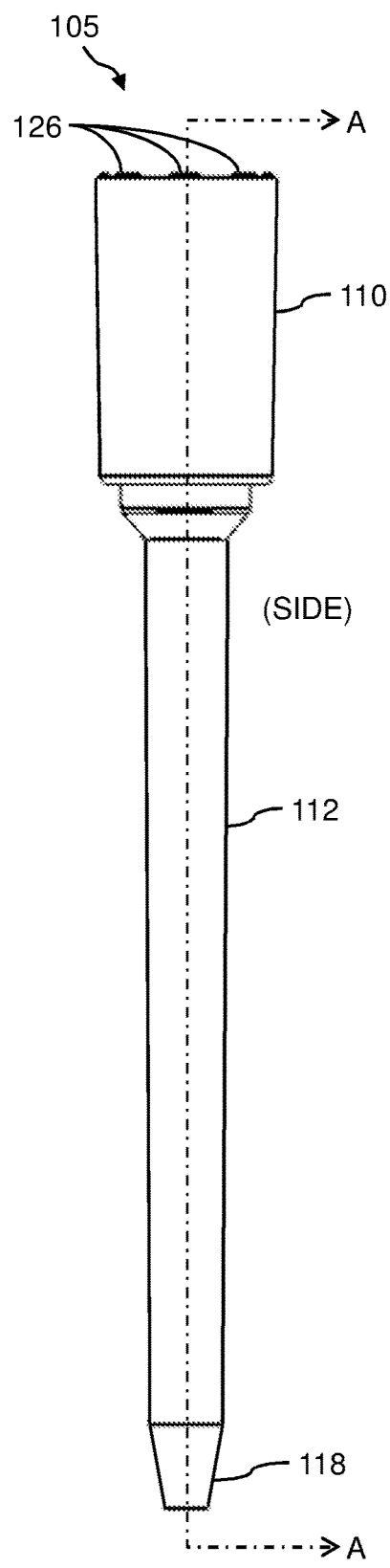
Figure 4B:
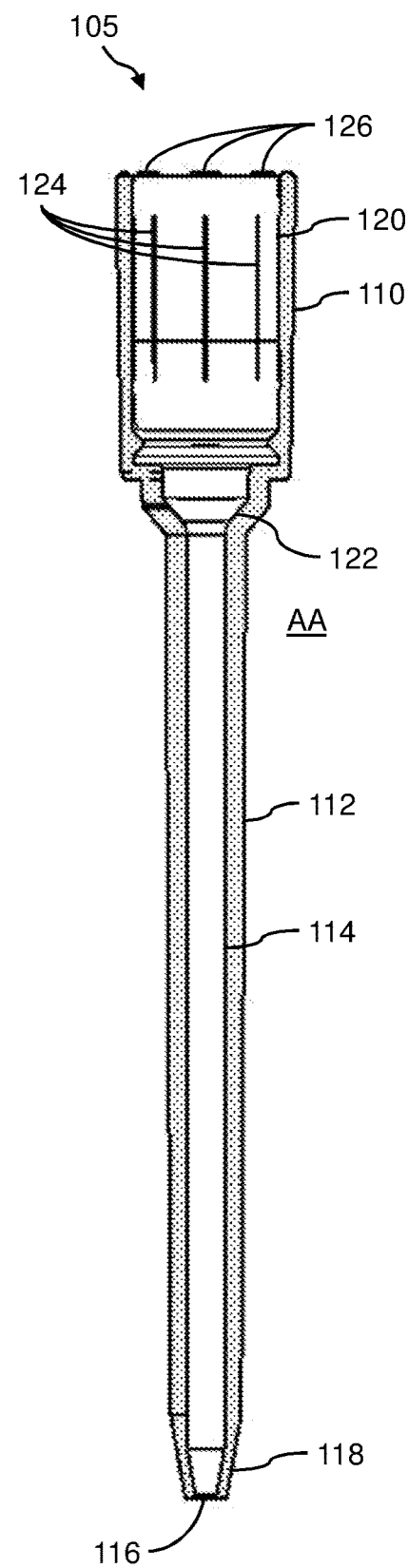
Figure 5A:
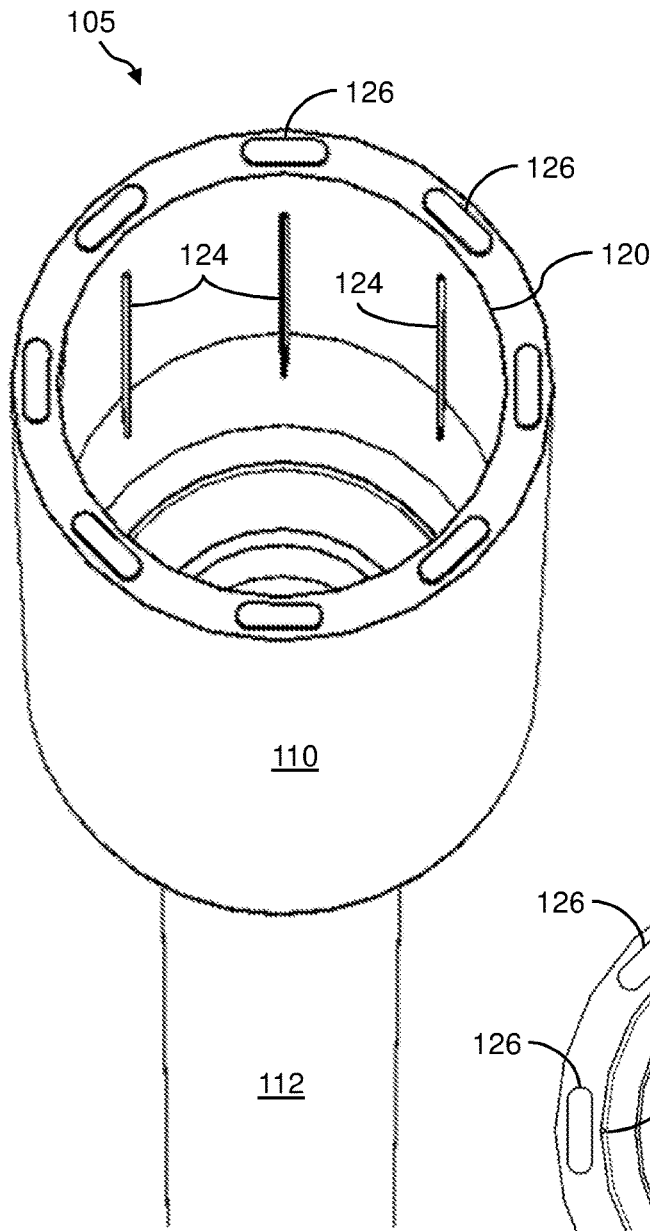
Figure 5B:
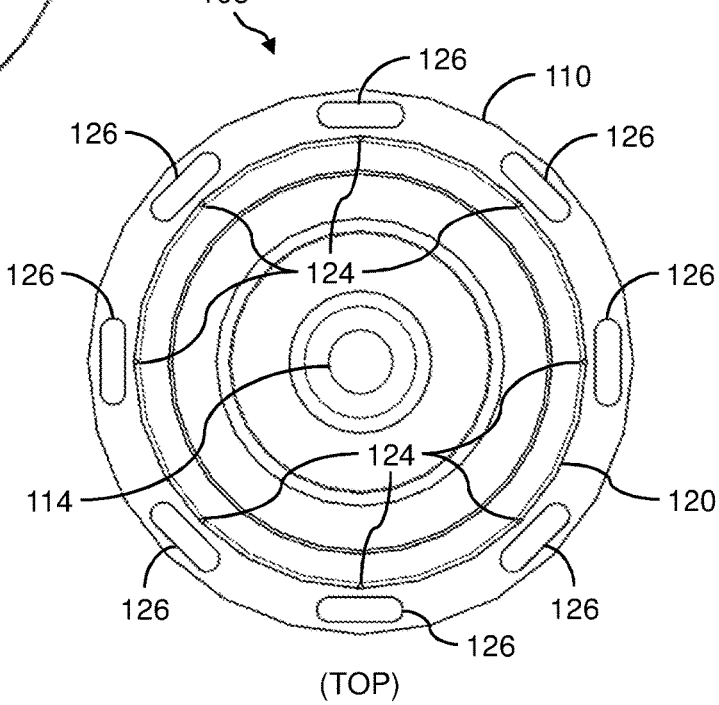
Figure 8A:
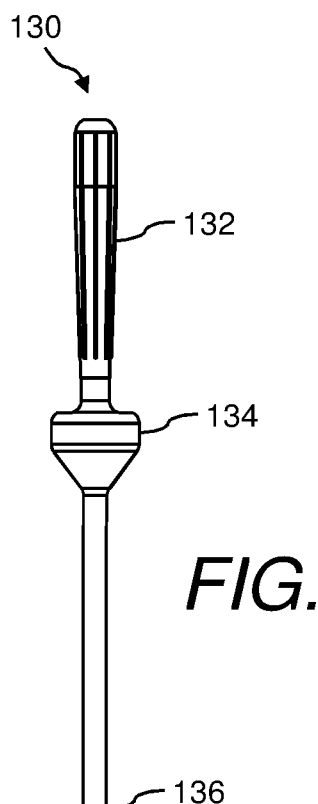
Figure 8B:
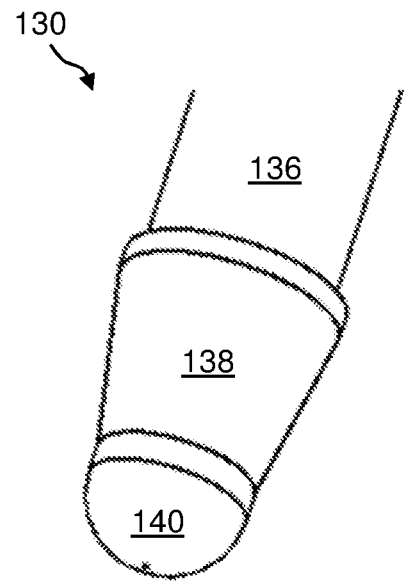
Figure 8C:
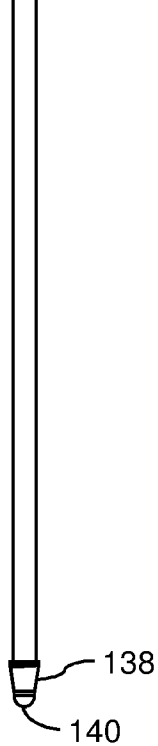
Figure 9A:
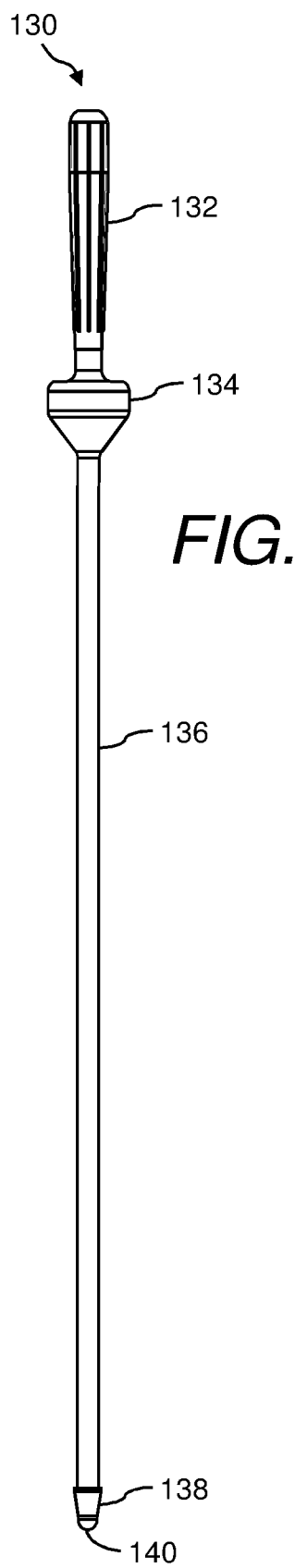
Figure 9B:
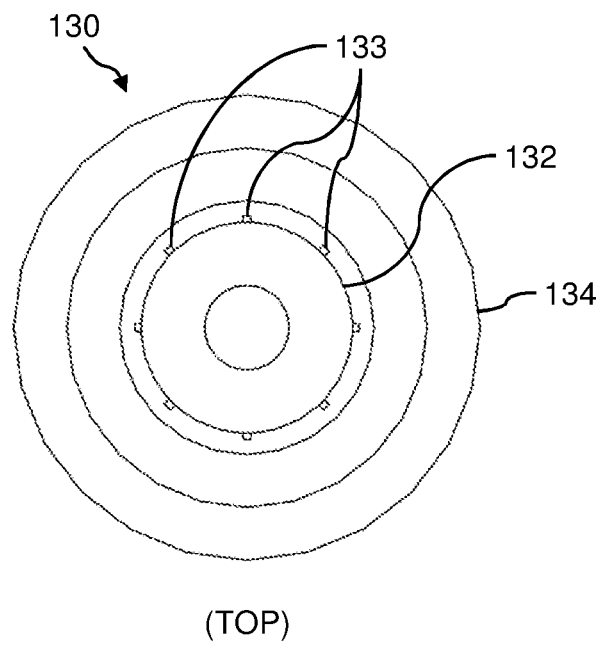
Figure 9C:
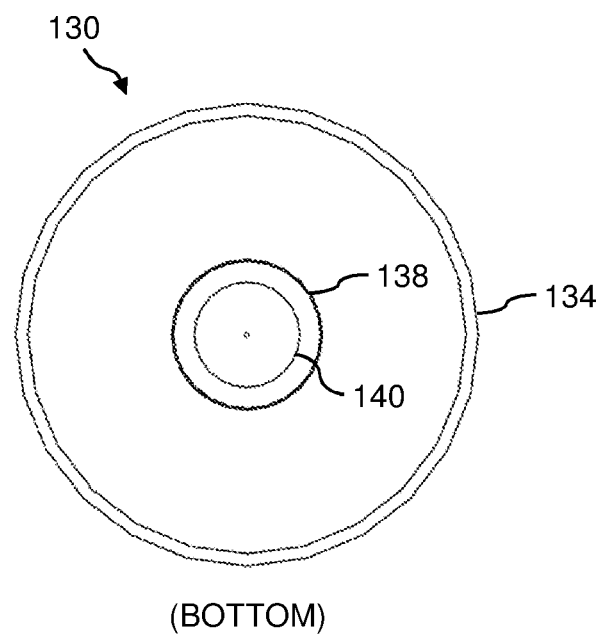
Figure 10:
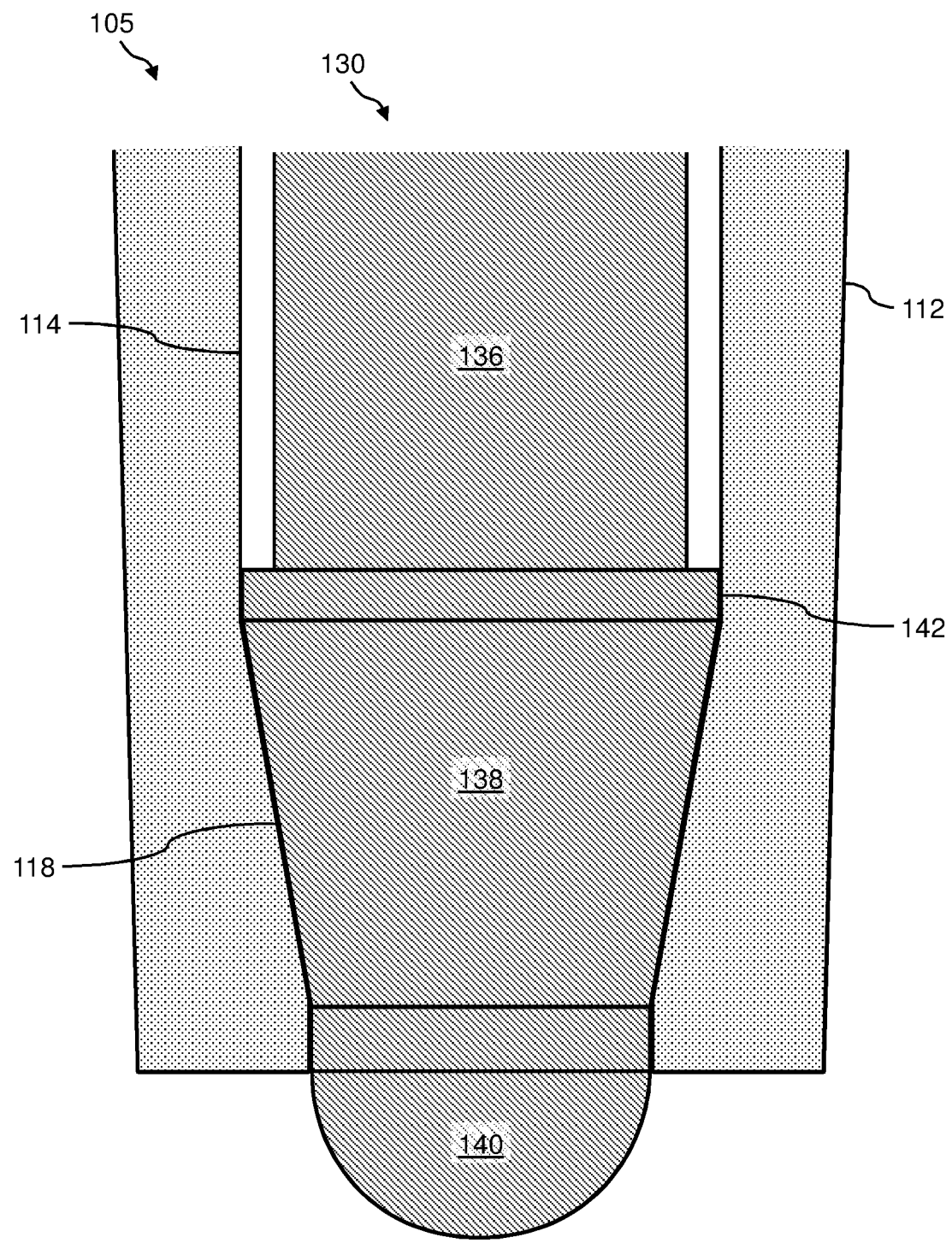
Figure 11:
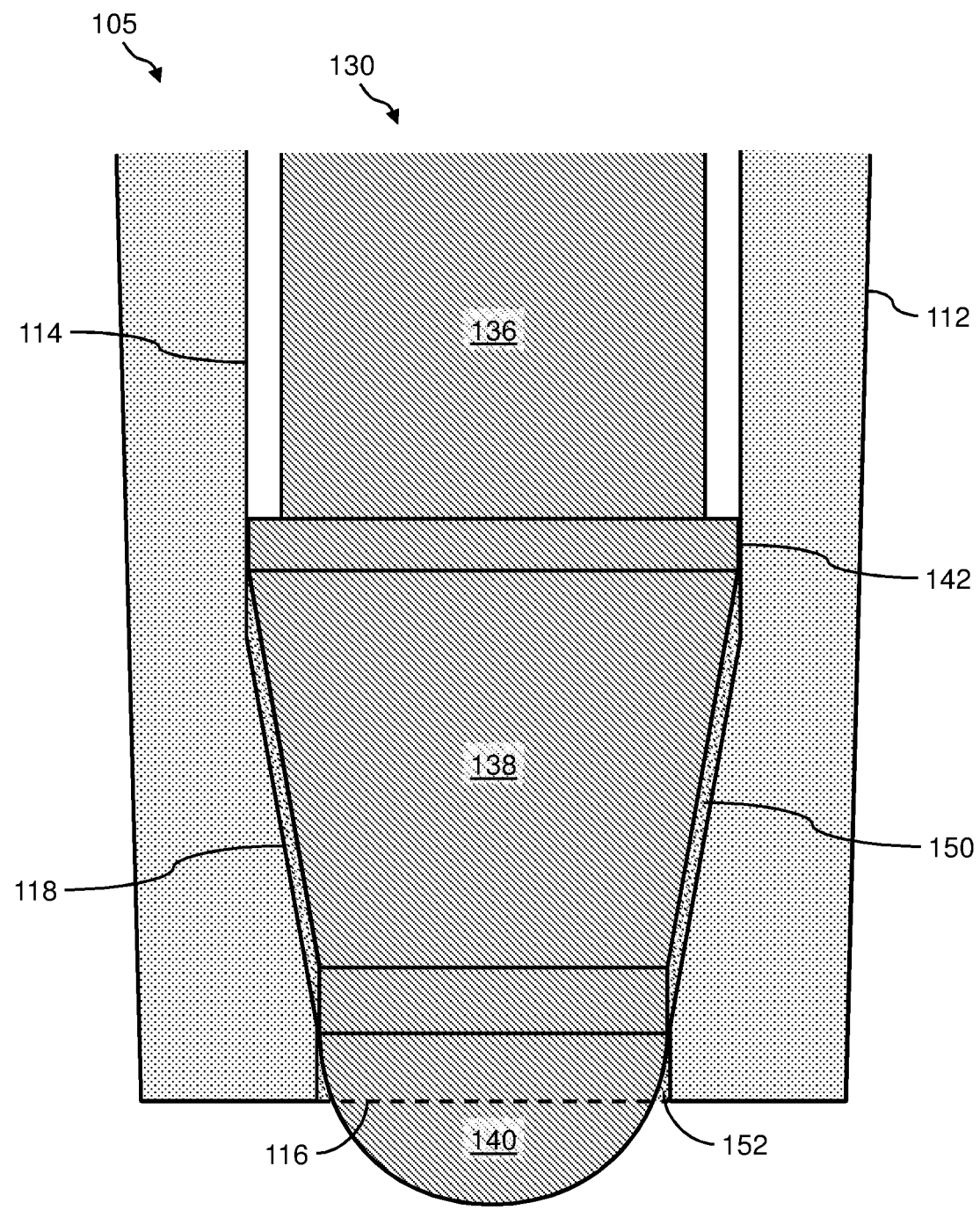
Figure 12:
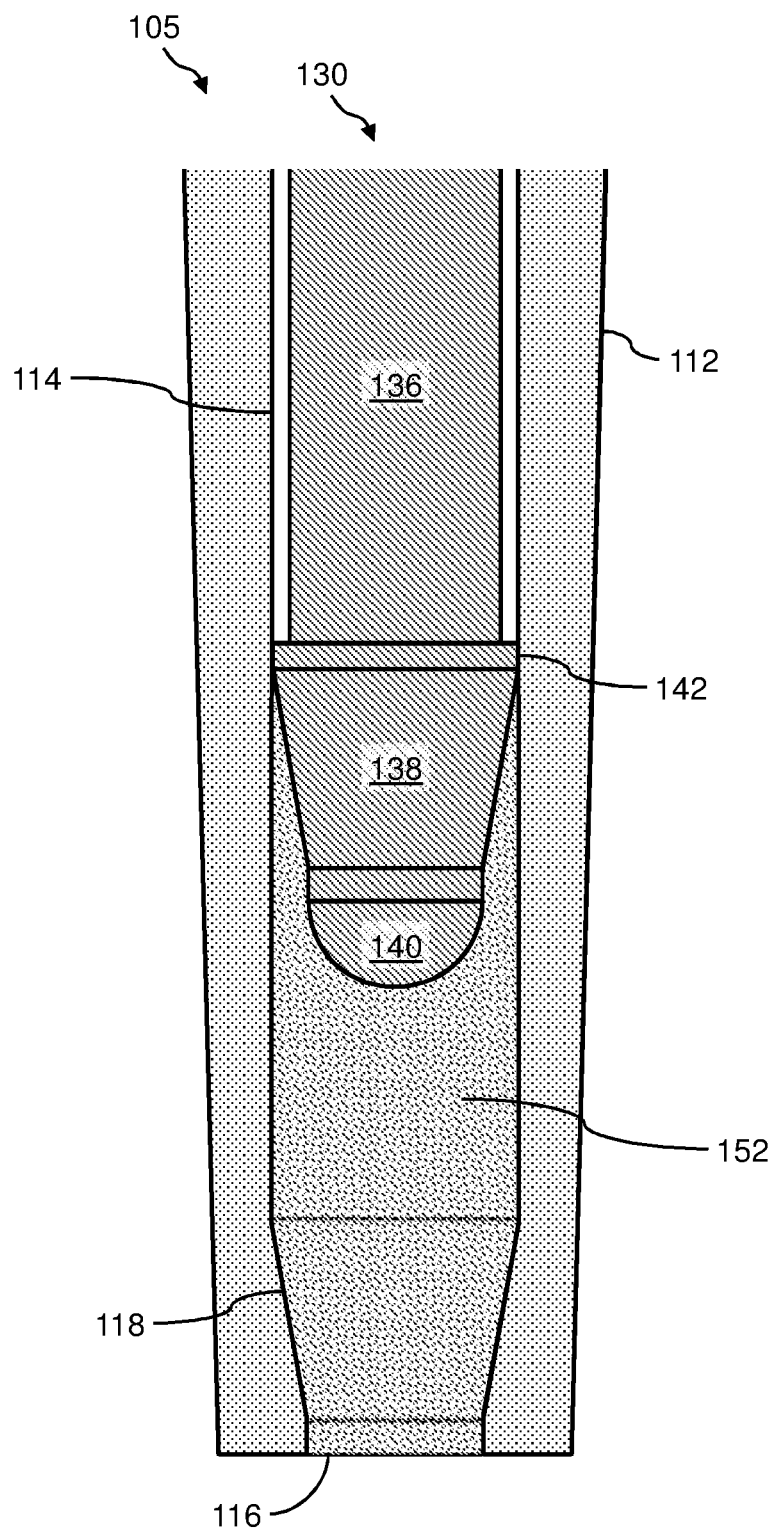
Figure 13:
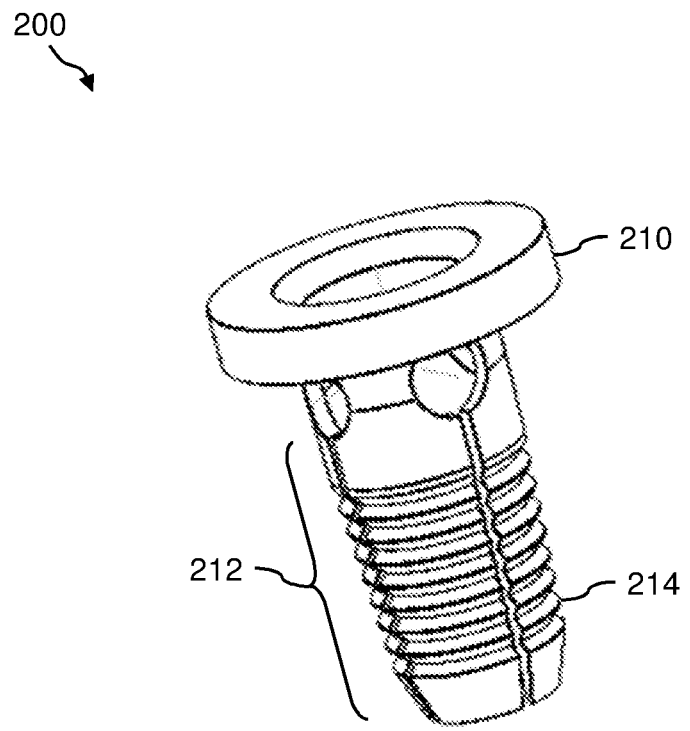
Figure 13:
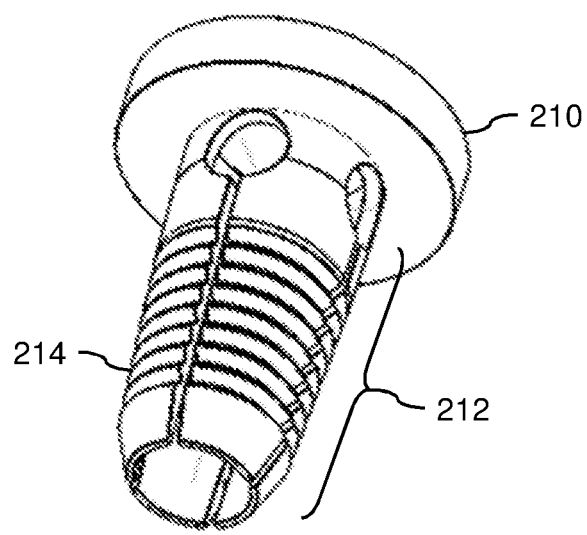
Figure 14:
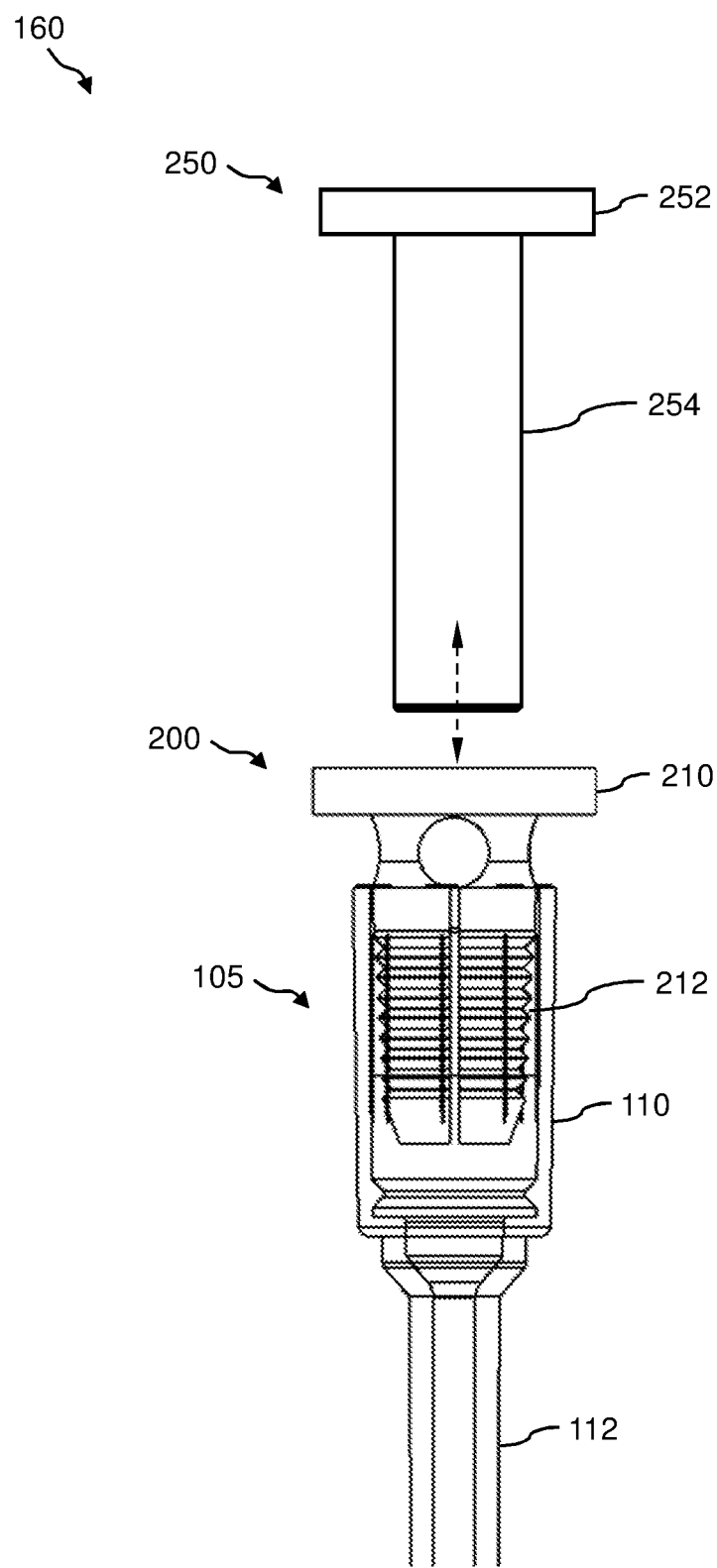
Figure 15A:
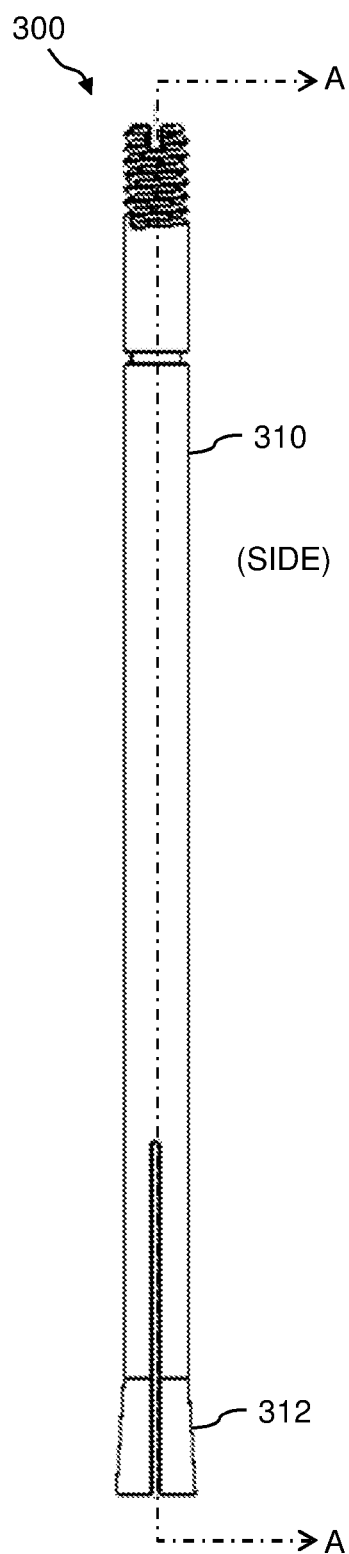
Figure 15B:
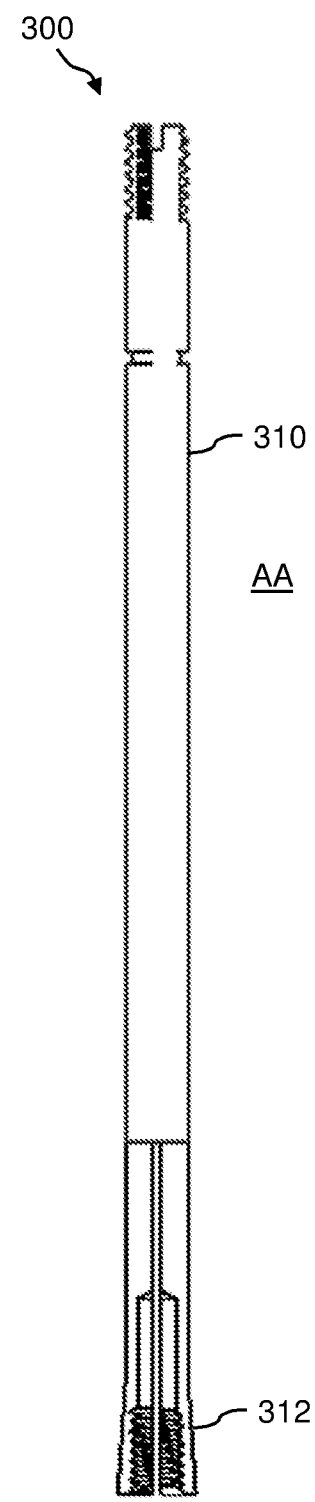
Figures 16A, 16B:
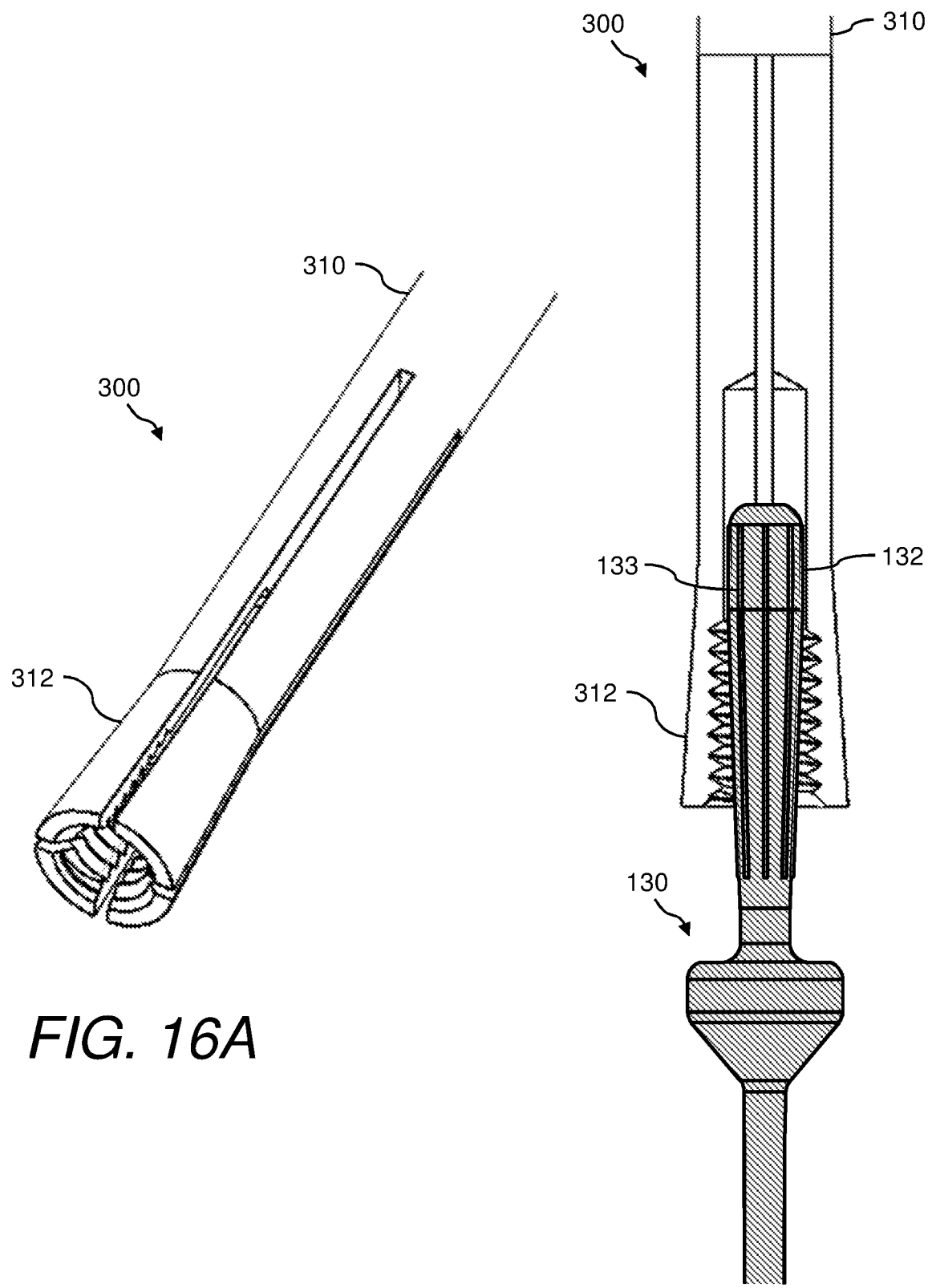
Figures 16C, 16D:
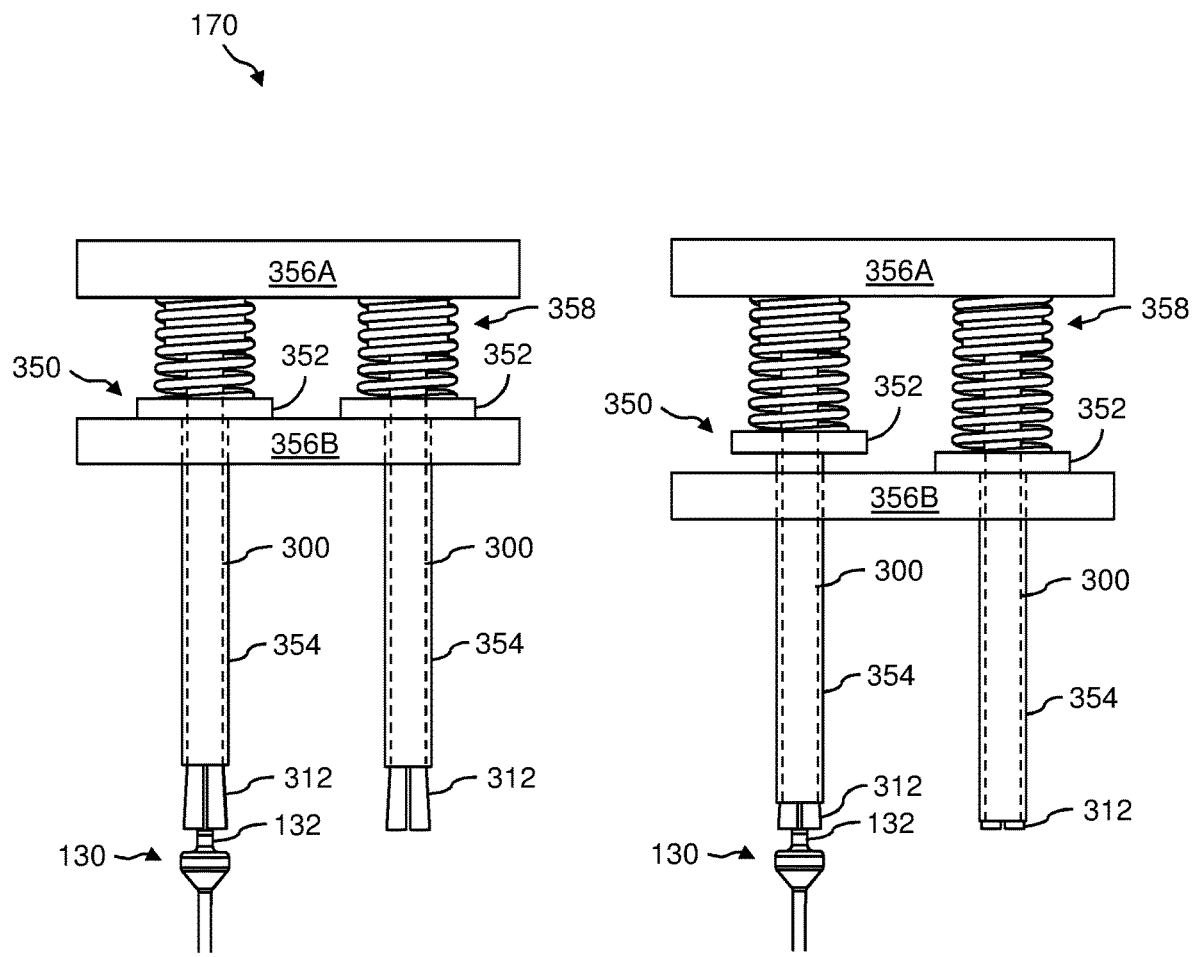
Figure 17:
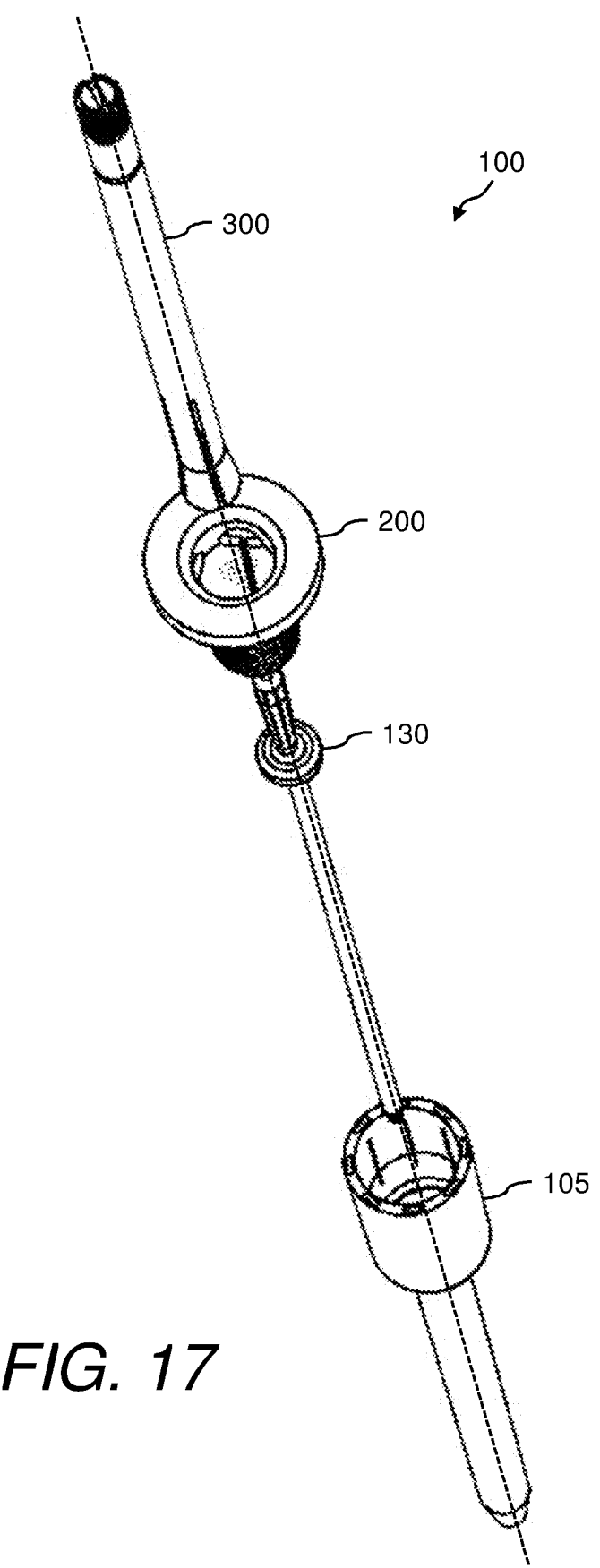
Figure 18:
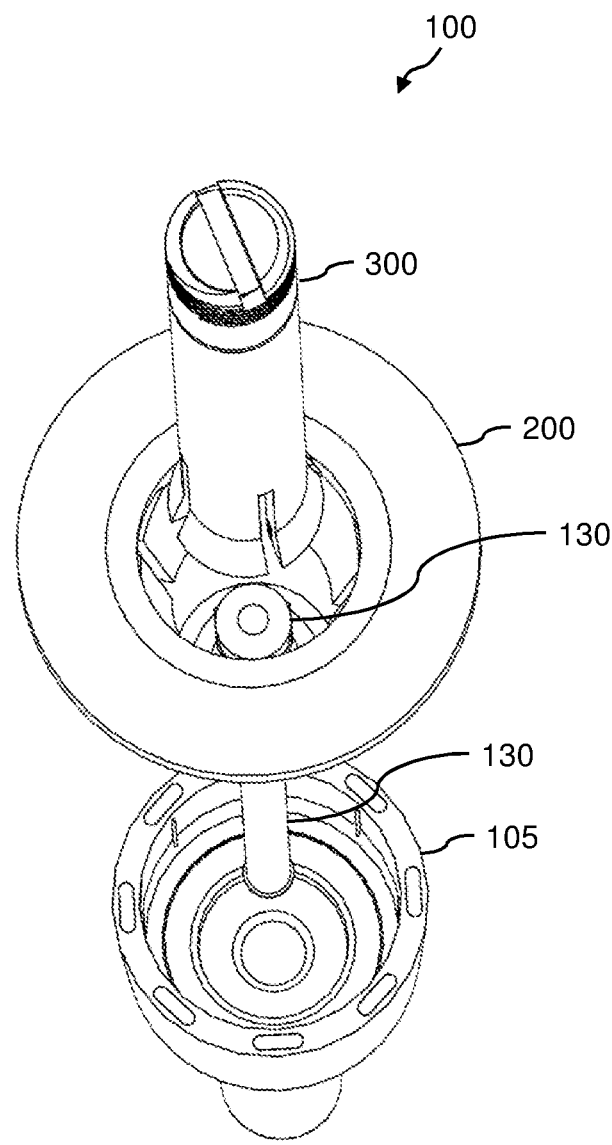
Figure 19:
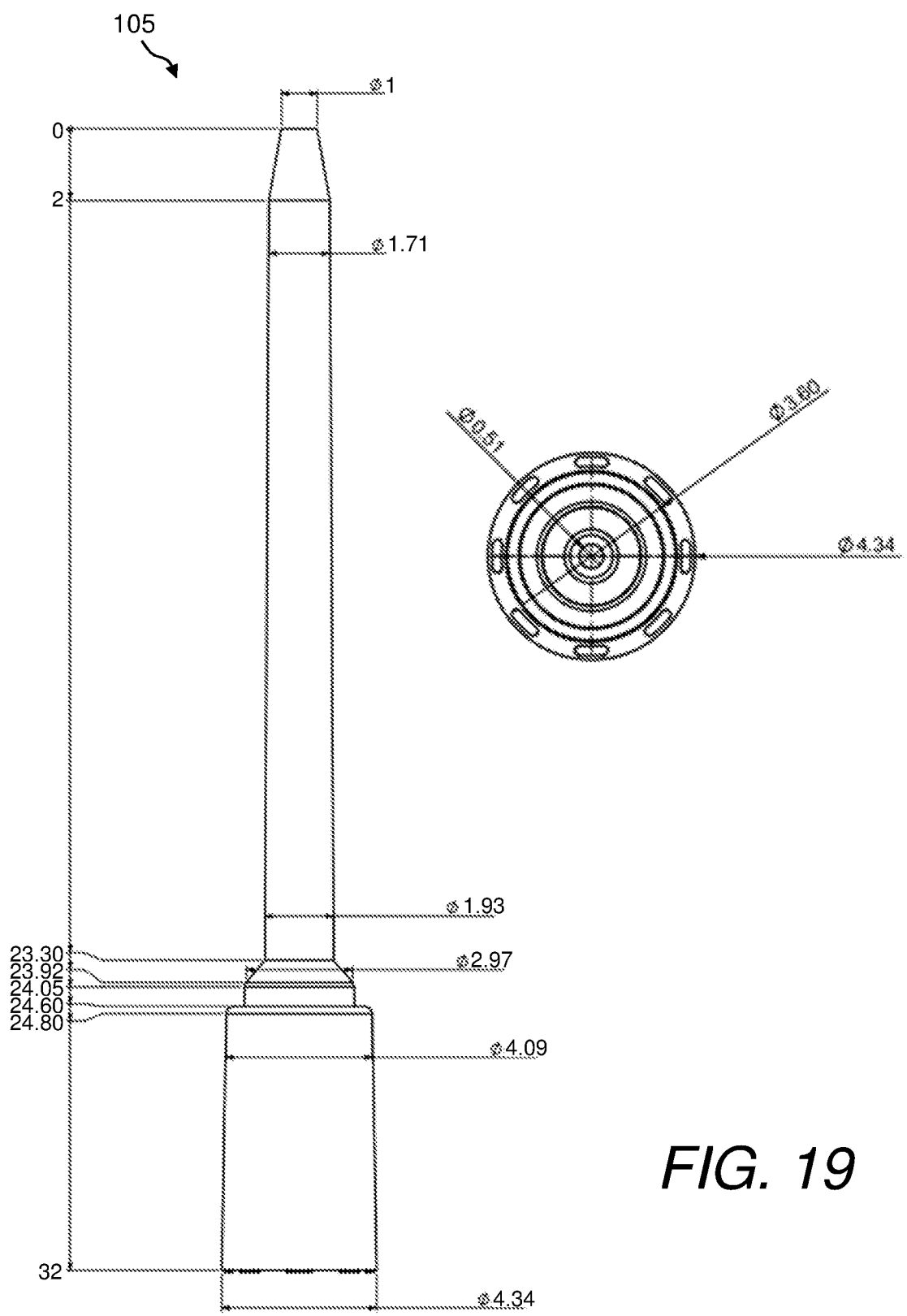
Figure 20:
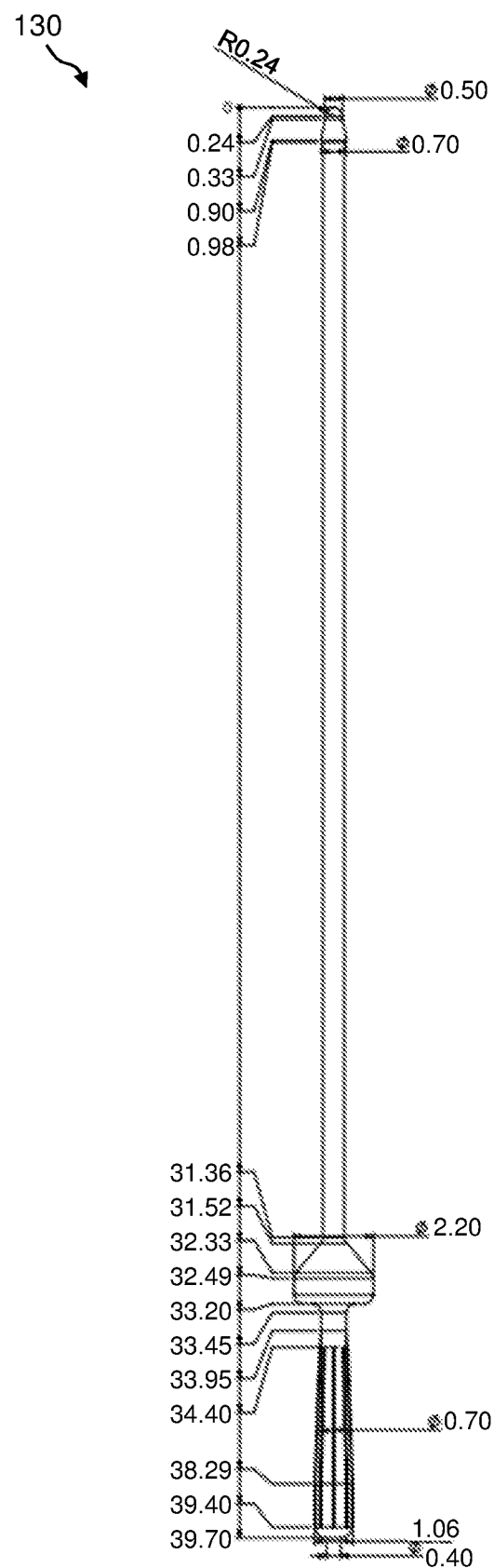
Figure 21:
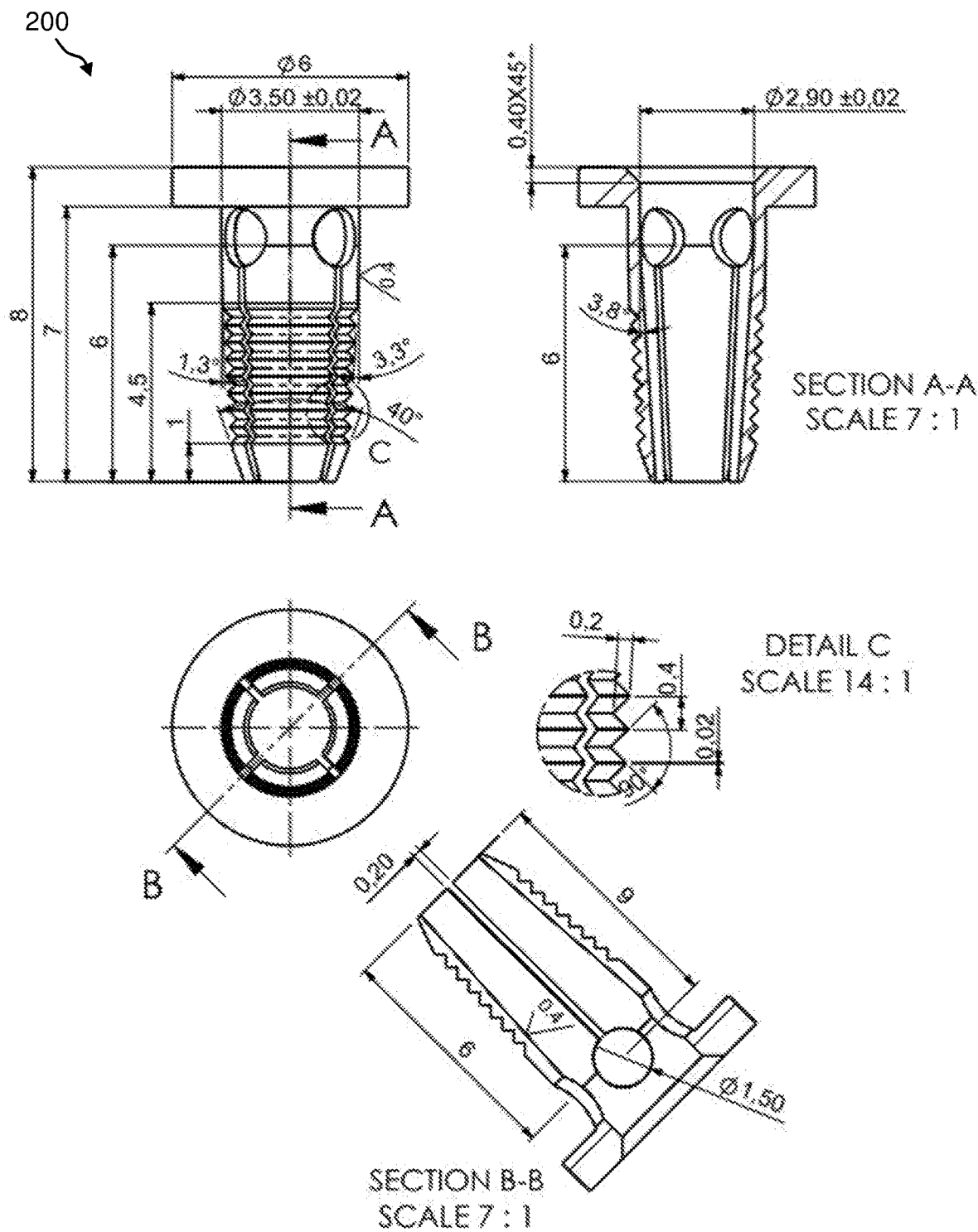
Figure 22:
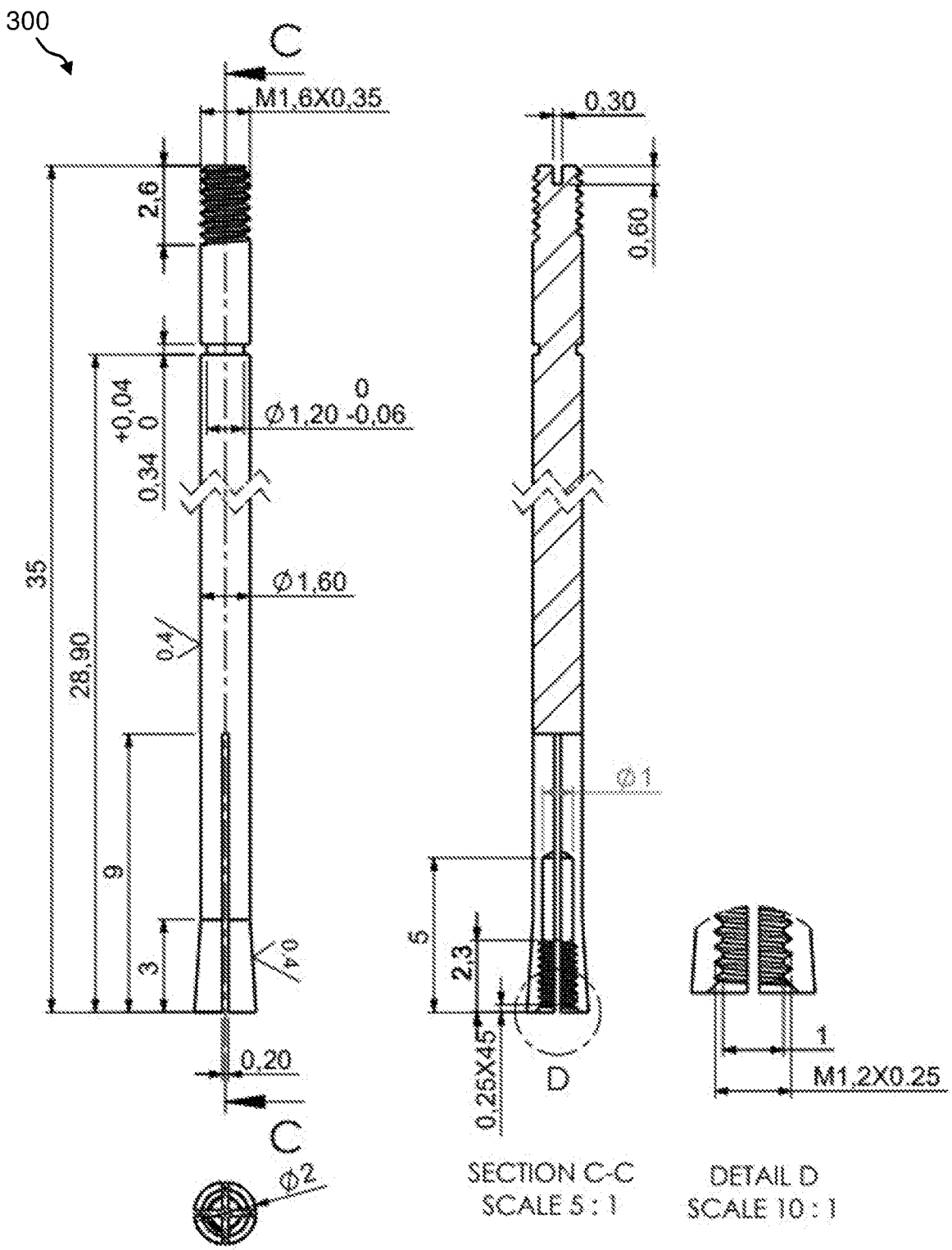

Having thus described the presently disclosed subject matter in general terms, reference will now be made to the accompanying Drawings, which are not necessarily drawn to scale, and wherein:

FIG. 1A and FIG. 1B illustrates perspective views of an example of a pipette tip and a pipette plunger, respectively, of the presently disclosed positive displacement pipette tip for aspirating and/or dispensing liquids in a liquid handling instrument and/or system;

FIG. 2 illustrates a cross-sectional view of an example of the presently disclosed positive displacement pipette tip that include the pipette tip and the pipette plunger shown in FIG. 1A and FIG. 1B;

FIG. 3 illustrates a cross-sectional view of the upper portion of the presently disclosed positive displacement pipette tip;

FIG. 4A and FIG. 4B illustrate a side view and a cross-sectional view, respectively, of the pipette tip of the presently disclosed positive displacement pipette tip;

FIG. 5A and FIG. 5B illustrate a perspective view and a top view, respectively, of an interface portion of the pipette tip;

FIG. 6A and FIG. 6B illustrate a perspective view of the distal tip portion of the pipette tip and a bottom view of the pipette tip, respectively;

FIG. 7A and FIG. 7B illustrate a side view of the pipette plunger and a perspective view of the upper portion of the pipette plunger, respectively;

FIG. 8A illustrates a side view of the pipette plunger;

FIG. 8B and FIG. 8C illustrate perspective views of the distal tip portion of the pipette plunger;

FIG. 9A illustrates a side view of the pipette plunger;

FIG. 9B and FIG. 9C illustrate a top view and a bottom view, respectively, of the distal tip portion of the pipette plunger;

FIG. 10, FIG. 11, and FIG. 12 illustrate close-up cross-sectional views of the distal tip portion of the pipette plunger with respect to the distal tip portion of the pipette tip;

FIG. 13 illustrates perspective views of an example of a pipette tip collet for use with the presently disclosed positive displacement pipette tip;

FIG. 14 illustrates a side view of an example of a pipette tip clamping mechanism that can be used with the presently disclosed positive displacement pipette tip;

FIG. 15A and FIG. 15B illustrate a side view and a cross-sectional view, respectively, of an example of a plunger collet for use with the presently disclosed positive displacement pipette tip;

FIG. 16A illustrates a perspective view of the collet chuck portion of the plunger collet shown in FIG. 15A and FIG. 15B;

FIG. 16B illustrates a cross-sectional view of the pipette plunger with respect to the plunger collet shown in FIG. 15A and FIG. 15B;

FIG. 16C and FIG. 16D show an example of a pipette plunger clamping mechanism and a process of clamping a pipette plunger of the presently disclosed positive displacement pipette tip;

FIG. 17 and FIG. 18 illustrate exploded views of the plunger collet, the pipette tip collet, the pipette tip, and the pipette plunger of the presently disclosed positive displacement pipette tip;

FIG. 19 illustrates various views showing more details of an example of the pipette tip the presently disclosed positive displacement pipette tip;

FIG. 20 illustrates a side view showing more details of an example of the pipette plunger the presently disclosed positive displacement pipette tip;

FIG. 21 illustrates various views showing more details of an example of the pipette tip collet shown in FIG. 13 and FIG. 14; and FIG. 22 illustrates various views showing more details of an example of the plunger collet shown in FIG. 15A through FIG. 16B.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a positive displacement pipette tip for motorized control automation or liquid handling instrument and/or system that includes a pipette tip and a pipette plunger.

In some embodiments, the presently disclosed positive displacement pipette tip can be used with a liquid handling instrument for aspirating and/or dispensing liquids.

In some embodiments, the presently disclosed positive displacement pipette tip may include a pipette tip and a pipette plunger designed to aspirate and/or dispense a precise volume of liquid.

In some embodiments, the presently disclosed positive displacement pipette tip includes a minimal sized void between the pipette tip and the pipette plunger, thereby optimizing the precision of the liquid volume being aspirated and/or dispensed.

In some embodiments, the pipette tip of the presently disclosed positive displacement pipette tip is designed to be used in combination with a zero-insertion force pipette tip clamping mechanism in, for example, a liquid handling instrument and wherein a feature component of the zero-insertion force pipette tip clamping mechanism may be a pipette tip collet.

In some embodiments, the pipette plunger of the presently disclosed positive displacement pipette tip is designed to be used in combination with a zero-insertion force pipette plunger clamping mechanism in, for example, a liquid handling instrument and wherein a feature component of the zero-insertion force pipette plunger clamping mechanism may be a plunger collet.

In some embodiments, the presently disclosed positive displacement pipette tip may be used with substantially any liquid class range.

In some embodiments, the presently disclosed positive displacement pipette tip includes certain features for guarding against contamination. For example, conventional air displacement pipette tips require a shared air column between all of the pipette tip interfaces, which can be a common source of contamination that can carry over to the next workflow. By contrast, the presently disclosed positive displacement pipette tip does not require a shared air column between pipette tips and is therefore absent this possible source of contamination.

Referring now to FIG. 1A, FIG. 1B, FIG. 2, and FIG. 3 are various views of an example of the presently disclosed positive displacement pipette tip 100 for aspirating and/or dispensing liquids in a liquid handling instrument and/or system. For example, the positive displacement pipette tip 100 may include a pipette tip 105 and a pipette plunger 130.

FIG. 1A shows a perspective view of an example of the pipette tip 105 of the presently disclosed positive displacement pipette tip 100. FIG. 1B shows a perspective view of an example of the pipette plunger 130 of the presently disclosed positive displacement pipette tip 100. Further, FIG. 2 shows a cross-sectional view of the pipette tip 105 and with the pipette plunger 130 positioned with respect to the pipette tip 105.

The pipette tip 105 of the positive displacement pipette tip 100 includes an interface portion 110 and a pipette tip body 112. The interface portion 110 may be, for example, an open barrel type of structure leading to the pipette tip body 112. Accordingly, the interface portion 110 has an inner wall 120. The interface portion 110 of the pipette tip 105 may be fitted to, for example, a mating component (see FIG. 13 and FIG. 14) of a liquid handling instrument (not shown) for aspirating and/or dispensing liquids. A fluid channel 114 runs along the length of the pipette tip body 112. There is an opening 116 (see FIG. 11 and FIG. 12) at the distal end of the fluid channel 114 through which fluid may be aspirated and/or dispensed. Additionally, the distal end of the pipette tip body 112 that leads to the opening 116 has a tapered tip 118 (see FIG. 10, FIG. 11, and FIG. 12). Further, a receptacle (or cavity) 122 is provided at the lower portion of the interface portion 110 of the pipette tip 105. The pipette tip 105 may be formed, for example, of polymeric material. More details of an example of the pipette tip 105 are shown and described hereinbelow with reference to FIG. 4A through FIG. 6B and FIG. 19.

A pipette plunger 130 is arranged along the inside of the pipette tip 105. The pipette plunger 130 includes a plunger upper portion 132, a plunger centering portion 134, and a plunger tip 136 that includes a distal tip portion 138. The plunger upper portion 132 may be fitted to, for example, a mating component (see FIG. 15A through FIG. 16B) of a liquid handling instrument (not shown) for aspirating and/or dispensing liquids using the positive displacement pipette tip 100. Further, the plunger centering portion 134 may be fitted into the plunger stop receptacle (or cavity) 122 of the interface portion 110 of the pipette tip 105, wherein the plunger stop receptacle (or cavity) 122 is designed to receive the plunger centering portion 134 of the pipette plunger 130. The plunger centering portion 134 acts as a "stopping" feature of the pipette plunger 130. The plunger tip 136 and distal tip portion 138 of the pipette plunger 130 may be fitted into the fluid channel 114 of the pipette tip body 112 of the pipette tip 105. Further, the distal tip portion 138 of the plunger tip 136 is designed to mate and seal with the opening 116 and the tapered tip 118 at the distal end of the fluid channel 114 of the pipette tip 105. More details of an example of the pipette plunger 130 are shown and described hereinbelow with reference to FIG. 7A through FIG. 9B and FIG. 20.

Further, FIG. 3 shows a cross-sectional view of the upper portion of the presently disclosed positive displacement pipette tip 100 shown in FIG. 2. For example, FIG. 3 shows a cross-sectional view of the upper portion of the pipette tip 105 and the pipette plunger 130 of the positive displacement pipette tip 100. In this view, other features of the pipette tip 105 and the pipette plunger 130 are depicted. For example, the pipette tip 105 further includes a set of vertical inner wall features 124 along the inner wall 120 of the interface portion 110. In one example, the pipette tip 105 includes eight vertical inner wall features 124. Each of the vertical inner wall features 124 is a raised or protruding vertical line feature that is formed along the inner wall 120 of the interface portion 110.

The set of vertical inner wall features 124 is provided to assist clamping or mating the interface portion 110 of the pipette tip 105 to a mating component (see FIG. 13 and FIG. 14) of a liquid handling instrument (not shown). For example, the set of vertical inner wall features 124 may assist by increasing the friction force for holding the pipette tip 105 in place while potentially reducing the given force.

Referring still to FIG. 3, the pipette plunger 130 further includes a set of vertical outer wall features 133 along the outer wall of the plunger upper portion 132. In one example, the pipette plunger 130 includes eight vertical outer wall features 133. Each of the vertical outer wall features 133 is a raised or protruding vertical line feature that is formed along the outer wall of the plunger upper portion 132.

The set of vertical outer wall features 133 is provided to assist clamping or mating the plunger upper portion 132 of the pipette plunger 130 to a mating component (see FIG. 15A through FIG. 16B) of a liquid handling instrument (not shown). For example, the set of vertical outer wall features 133 may assist by increasing the friction force for holding the pipette plunger 130 in place while potentially reducing the given force.

Referring now to FIG. 4A and FIG. 4B are a side view and a cross-sectional view, respectively, of the pipette tip 105 of the presently disclosed positive displacement pipette tip 100. For example, FIG. 4B is a cross-sectional view taken along line A-A of FIG. 4A. Further, FIG. 5A and FIG. 5B show a perspective view and a top view, respectively, of the interface portion 110 of the pipette tip 105. A set of standoff or spacer features 126 are provided around the upper rim of the interface portion 110 of the pipette tip 105. In one example, eight standoff or spacer features 126 are provided. Further, FIG. 6A and FIG. 6B show a perspective view of the distal tip portion (i.e., the tapered tip 118) of the pipette tip 105 and a bottom view of the pipette tip 105, respectively.

Referring now to FIG. 7A and FIG. 7B are a side view of the pipette plunger 130 and a perspective view of the plunger upper portion 132 of the pipette plunger 130, respectively. Further, FIG. 8A shows again the side view of the pipette plunger 130. Further, FIG. 8B and FIG. 8C show perspective views of the distal tip portion 138 of the pipette plunger 130. The distal tip portion 138 has a rounded portion 140 that is designed to seal into the opening 116 of the fluid channel 114 (see FIG. 10 and FIG. 11). The pipette plunger 130 is formed, for example, of polymeric material. The polymer used to form the pipette plunger 130 may be the same as or different from the polymer used to form the pipette tip 105. Further, FIG. 9A shows again side view of the pipette plunger 130. Further, FIG. 9B and FIG. 9C shows a top view and a bottom view, respectively, of the distal tip portion 138 of the pipette plunger 130.

Referring now to FIG. 10, FIG. 11, and FIG. 12 are close-up cross-sectional views of the distal tip portion 138 of the pipette plunger 130 with respect to the distal tip portion of the pipette tip body 112 of the pipette tip 105. Again, the rounded portion 140 of the distal tip portion 138 of the pipette plunger 130 is designed to mate with the opening 116 and the tapered tip 118 at the distal end of the fluid channel 114 of the pipette tip 105, as shown, for example, in FIG. 10 and FIG. 11. For example, the distal tip portion 138 has tapered sidewalls that correspond to the tapered tip 118 of the fluid channel 114.

Further, an outer upper edge 142 of the distal tip portion 138 of the plunger tip 136 is sized to slideably seal against and along the walls of the fluid channel 114 of the pipette tip body 112. The outer upper edge 142 of the distal tip portion 138 of the plunger tip 136 provides a "sealing" ring feature of the pipette plunger 130 that may hold reliable for many mixing cycles before eventually wearing down and leaking.

FIG. 11 also shows a small void 150 between the tapered tip 118 of the fluid channel 114 and the tapered sidewalls the distal tip portion 138 of the pipette plunger 130. In one example, aspirating fluid 152 can be trapped within this void 150. A beneficial feature of the positive displacement pipette tip 100 is that the design of the distal tip portion 138 of the pipette plunger 130 minimizes the size of the void 150. As a result, the liquid volume being aspirated and/or dispensed can be precisely held. Further, the positive displacement pipette tip 100 can be used with substantially any liquid class range.

FIG. 12 shows an example of the positive displacement pipette tip 100 when in use. In one example, FIG. 12 shows the pipette plunger 130 being withdrawn and the aspirating fluid 152 being drawn into the fluid channel 114 of the pipette tip body 112 of the pipette tip 105. In another example, FIG. 12 shows the pipette plunger 130 being pushed and the dispensing fluid 152 being pushed out of the fluid channel 114 of the pipette tip body 112 of the pipette tip 105.

In standard air displacement pipette tips, things such as temperature, atmospheric pressure, specific gravity, and viscosity of the solution may affect the performance of air displacement pipettes. By contrast, positive displacement pipettes may be used to accurately pipette very viscous, volatile, hot or cold, or corrosive samples. The presently disclosed positive displacement pipette tip 100 that includes the pipette tip 105 and the pipette plunger 130 is an example of a positive displacement pipette.

In operation of the presently disclosed positive displacement pipette tip 100 in a liquid handling instrument and/or system, the pipette tip 105 is held fixed while the pipette plunger 130 may be actuated with respect to the pipette tip 105 for aspirating and/or dispensing liquids. A benefit of the presently disclosed positive displacement pipette tip 100 is that the pipette tip 105 is designed to be manipulated via a zero-insertion force pipette tip clamping mechanism 160 (see FIG. 14). In one example, the zero-insertion force pipette tip clamping mechanism 160 (see FIG. 14) for the pipette tip 105 features a pipette tip collet 200, as shown, for example, in FIG. 13, FIG. 14, and FIG. 21. Likewise, the pipette plunger 130 is designed to be manipulated via a zero-insertion force pipette plunger clamping mechanism 170 (see FIG. 16C and FIG. 16D). In one example, the zero-insertion force pipette plunger clamping mechanism 170 (see FIG. 16C and FIG. 16D) for the pipette tip 105 features a plunger collet 300, as shown, for example, in FIG. 15A, FIG. 15B, FIG. 16A, FIG. 16B, and FIG. 22.

Referring now to FIG. 13 is perspective views of an example of the pipette tip collet 200 for use with the pipette tip 105 of the presently disclosed positive displacement pipette tip 100. Further, FIG. 14 shows a transparent view of the pipette tip 105 with respect to the pipette tip collet 200 shown in FIG. 13. The pipette tip collet 200 may include, for example, a pipette tip collet upper ring plate 210 and a collet chuck portion 212 for fitting inside the interface portion 110 of the pipette tip 105. Further, the collet chuck portion 212 of the pipette tip collet 200 has a serrated feature 214 to increase the friction to the interface portion 110 of the pipette tip 105, as shown, for example, in FIG. 14.

The pipette tip collet 200 is a feature component of, for example, a pipette tip clamping mechanism 160, as shown, for example, in FIG. 14. The pipette tip clamping mechanism 160 is an example of a zero-insertion force pipette tip clamping mechanism that can be used with the presently disclosed positive displacement pipette tip 100. Generally, a "collet" is a segmented band or sleeve that can be expanded and/or contracted. The collet chuck portion 212 of the pipette tip collet 200 is designed to clamp onto any member surrounding the chuck. For example, the collet chuck portion 212 of the pipette tip collet 200 is a segmented band or sleeve for fitting inside the interface portion 110 of the pipette tip 105. The collet chuck portion 212 of the pipette tip collet 200 is designed to expand and lock against the inner wall 120 of the interface portion 110 of the pipette tip 105 (see FIG. 14). That is, when in the locked position, the collet chuck portion 212 (or clamping chuck) clamps onto the interface portion 110 of the pipette tip 105 that is surrounding the collet chuck portion 212. Further, the set of vertical inner wall features 124 of the interface portion 110 of the pipette tip 105 may be used to assist clamping or mating the interface portion 110 of the pipette tip 105 to the collet chuck portion 212 of the pipette tip collet 200. More details of an example of the pipette tip collet 200 are shown and described hereinbelow with reference to FIG. 21.

Referring now to FIG. 14, the pipette tip collet 200 is a feature component of the pipette tip clamping mechanism 160. Further, FIG. 14 shows a transparent view of the positive displacement pipette tip 105 with respect to the pipette tip collet 200 shown in FIG. 13. Generally, a "collet" is a segmented band or sleeve that can be expanded and/or contracted. The collet chuck portion 212 of the pipette tip collet 200 is designed to clamp onto any member surrounding the chuck. For example, the collet chuck portion 212 of the pipette tip collet 200 is a segmented band or sleeve for fitting inside the interface portion 110 of the positive displacement pipette tip 105. The collet chuck portion 212 of the pipette tip collet 200 is designed to expand and lock against the inner wall 220 of the interface portion 110 of the positive displacement pipette tip 105. That is, when in the locked position, the collet chuck portion 212 (or clamping chuck) clamps onto the interface portion 110 of the positive displacement pipette tip 105 that is surrounding the collet chuck portion 212. Further, the set of vertical inner wall features 224 of the interface portion 110 of the positive displacement pipette tip 105 and/or the serrated feature 214 of the pipette tip collet 200 may be used to assist clamping or mating the interface portion 110 of the positive displacement pipette tip 105 to the collet chuck portion 212 of the pipette tip collet 200.

The pipette tip clamping mechanism 160 is a zero-insertion force pipette tip clamping mechanism. The pipette tip clamping mechanism 160 includes the pipette tip collet 200 and a pipette tip lock mechanism 250. The pipette tip lock mechanism 250 may include, for example, a pipette tip lock upper ring plate 252 and a hollow sleeve portion 254 for fitting inside the collet chuck portion 212 of the pipette tip collet 200. For example, when the hollow sleeve portion 254 is fitted inside the collet chuck portion 212 of the pipette tip collet 200, the collet chuck portion 212 expands against the inside wall 220 of the interface portion 110 of the positive displacement pipette tip 105. By contrast, when the hollow sleeve portion 254 is withdrawn from the collet chuck portion 212 of the pipette tip collet 200, the collet chuck portion 212 retracts and becomes loose with respect to the interface portion 110 of the positive displacement pipette tip 105.

Referring now to FIG. 15A and FIG. 15B, FIG. 15A is a side view of the plunger collet 300 while FIG. 15B is a cross-sectional view of the plunger collet 300 taken along line A-A of FIG. 15A. The plunger collet 300 is for use with the pipette plunger 130 of the presently disclosed positive displacement pipette tip 100. The plunger collet 300 may include, for example, a shaft portion 310 and a collet chuck portion 312 for fitting around the plunger upper portion 132 of the pipette plunger 130. Further, FIG. 16A shows a perspective view of the collet chuck portion 312 of the pipette plunger 130 and FIG. 16B is a cross-sectional view of the pipette plunger 130 with respect to the collet chuck portion 312 of the plunger collet 300.

The plunger collet 300 is a feature component of the zero-insertion force pipette plunger clamping mechanism 170 (see FIG. 16C and FIG. 16D). The collet chuck portion 312 of the plunger collet 300 is designed to clamp around any member inside the chuck. For example, the collet chuck portion 312 of the plunger collet 300 is a segmented band or sleeve for fitting around the plunger upper portion 132 of the pipette plunger 130. The collet chuck portion 312 of the plunger collet 300 is designed to expand and lock against the outside wall of the plunger upper portion 132 of the pipette plunger 130 (see FIG. 16B). That is, when in the locked position, the collet chuck portion 312 (or clamping chuck) clamps onto the plunger upper portion 132 of the pipette plunger 130 that is inside the collet chuck portion 312. Further, the set of vertical outer wall features 133 of the plunger upper portion 132 of the pipette plunger 130 may be used to assist clamping or mating the plunger upper portion 132 to the collet chuck portion 312 of the plunger collet 300. More details of an example of the plunger collet 300 are shown and described hereinbelow with reference to FIG. 22.

Referring now to FIG. 16C and FIG. 16D is an example of a pipette plunger clamping mechanism 170 and a process of clamping a pipette plunger of the presently disclosed positive displacement pipette tip 100. The plunger collet 300 is a feature component of the pipette plunger clamping mechanism 170. Pipette plunger clamping mechanism 170 is a zero-insertion force pipette plunger clamping mechanism. The pipette plunger clamping mechanism 170 includes the plunger collet 300 and a pipette plunger lock mechanism 350. The pipette plunger lock mechanism 350 may include, for example, an upper ring plate 352 and a hollow sleeve portion 354 for fitting around the plunger collet 300 including the collet chuck portion 312. For example, when the hollow sleeve portion 354 is slid down around the collet chuck portion 312 of the plunger collet 300, the collet chuck portion 312 closes against (clamps) the plunger upper portion 132 of the pipette plunger 130. By contrast, when the hollow sleeve portion 354 is withdrawn from the collet chuck portion 312 of the plunger collet 300, the collet chuck portion 312 releases the plunger upper portion 132 of the pipette plunger 130.

FIG. 16C and FIG. 16D show a pair of the pipette plunger clamping mechanisms 170 installed with respect to two plates (356A and 356B) and with two springs 358 between the two plates (356A and 356B). For example, the upper plate 356A is held fixed while each spring 358 provides spring force to a corresponding pipette plunger lock mechanism 350 that passes in slidable (floating) fashion through the lower plate 356B. Further, the upper ends of the plunger collet 300 are fixed to the upper plate 356A. Accordingly, the plunger collets 300 are held fixed with respect to the upper plate 356A while the pipette plunger lock mechanisms 350 and the lower plate 356B are moveable with respect to the upper plate 356A. Accordingly, the pipette plunger lock mechanisms 350 are moveable with respect to the plunger collets 300.

For example, FIG. 16C shows the pipette plunger clamping mechanisms 170 in the non-clamping state. In FIG. 16C, the lower plate 356B is pulled upward toward the upper plate 356A, while compressing the two springs 358. In this state, the hollow sleeve portion 354 of the pipette plunger lock mechanisms 350 is pulled up and away from the collet chuck portion 312 of the plunger collet 300, which allows the plunger collet 300 to open up or expand. In this state, the pipette plunger 130 may be installed into or removed from the plunger collet 300.

By contrast, FIG. 16D shows the pipette plunger clamping mechanisms 170 in the clamping state. In FIG. 16D, the spring force of the two springs 358 pushes the lower plate 356B and the pipette plunger lock mechanisms 350 away from the upper plate 356A. In this state, the hollow sleeve portion 354 pushes down around the collet chuck portion 312 of the plunger collet 300, which causes the plunger collet 300 to close or contract. In this state, the plunger collet 300 is clamped onto the pipette plunger.

The pipette plunger clamping mechanism 170 uses the springs 358 to set the locking preload independently, so that each pipette plunger clamping mechanism 170 can handle independently any varying plunger dimensions from one pipette plunger 130 to the next.

Referring now to FIG. 17 and FIG. 18 are exploded views of the plunger collet 300, the pipette tip collet 200, the pipette tip 105, and the pipette plunger 130 of the presently disclosed positive displacement pipette tip 100.

Referring now to FIG. 19 are various views showing more details of a non-limiting example of the pipette tip 105 the presently disclosed positive displacement pipette tip 100. All dimensions shown in FIG. 19 are in millimeters. The details of the pipette tip 105 shown in FIG. 19 are exemplary only. The pipette tip 105 is not limited to exact dimensions and features shown in FIG. 19.

Referring now to FIG. 20 is a side view showing more details of a non-limiting example of the pipette plunger 130 the presently disclosed positive displacement pipette tip 100. All dimensions shown in FIG. 20 are in millimeters. The details of the pipette plunger 130 shown in FIG. 20 are exemplary only. The pipette plunger 130 is not limited to exact dimensions and features shown in FIG. 20.

Referring now to FIG. 21 are various views showing more details of a non-limiting example of the pipette tip collet 200 shown in FIG. 13 and FIG. 14. All dimensions shown in FIG. 21 are in millimeters. The details of the pipette tip collet 200 shown in FIG. 21 are exemplary only. The pipette tip collet 200 is not limited to exact dimensions and features shown in FIG. 21.

Referring now to FIG. 22 are various views showing more details of a non-limiting example of the plunger collet 300 shown in FIG. 15A through FIG. 16B. All dimensions shown in FIG. 22 are in millimeters. The details of the plunger collet 300 shown in FIG. 22 are exemplary only. The plunger collet 300 is not limited to exact dimensions and features shown in FIG. 22.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A pipette tip, comprising: a pipette tip having an interface portion and a pipette tip body, the interface portion having an inner wall and a receptacle, the pipette tip body having a fluid channel along the length of the pipette tip body, the fluid channel having an opening at the distal end of the fluid channel; and a pipette plunger positioned along the inside of the pipette tip, the pipette plunger having a plunger upper portion, a plunger centering portion, and a plunger tip having a distal tip portion, wherein the receptacle is adapted to receive the plunger centering portion, and wherein the fluid channel is adapted to receive the distal tip portion of the plunger tip, wherein the plunger upper portion has an outer wall, the outer wall including vertical outer wall features, and wherein the plunger upper portion is configured to be fitted to a mating component of a liquid handling instrument with assistance of the vertical outer wall features.

2. The pipette tip of claim 1, wherein the fluid channel has a tapered tip at the distal end of the fluid channel.

3. The pipette tip of claim 2, wherein the distal tip portion of the pipette plunger has a rounded portion adapted to mate with the opening and the tapered tip at the distal end of the fluid channel.

4. The pipette tip of claim 3, wherein the distal tip portion has tapered sidewalls corresponding to the tapered tip of the fluid channel.

5. The pipette tip of claim 4, wherein the fluid channel has walls, the distal tip portion having an outer upper edge sized to slideably seal against and along the walls of the fluid channel sufficient to minimize the void between the tapered tip of the fluid channel and the tapered sidewalls of the distal tip portion.

6. The pipette tip of claim 5, wherein the outer upper edge has a sealing ring feature formed thereon.

7. The pipette tip of claim 1, wherein the pipette tip is formed of a polymeric material.

8. The pipette tip of claim 7, wherein the pipette plunger is formed of the polymeric material that is same as the pipette tip.

9. The pipette tip of claim 7, wherein the pipette plunger is formed of a polymeric material that is different from the polymeric material of the pipette tip.

10. The pipette tip of claim 1, wherein the inner wall of the interface portion includes vertical inner wall features.

11. The pipette tip of claim 10, wherein each of the vertical inner wall features is a raised or protruding vertical line formed along the inner wall of the interface portion.

12. The pipette tip of claim 1, wherein each of the vertical outer wall features is a raised or protruding vertical line formed along the outer wall of the plunger upper portion.

13. The pipette tip of claim 1, wherein the interface portion has an upper rim with a set of spacer features.

14. A liquid handling system, comprising: a pipette tip having an interface portion and a pipette tip body, the interface portion having an inner wall and a receptacle, the pipette tip body having a fluid channel along the length of the pipette tip body, and the fluid channel having an opening at the distal end of the fluid channel; a pipette plunger positioned along the inside of the pipette tip, the pipette plunger having a plunger upper portion, a plunger centering portion, and a plunger tip having a distal tip portion, wherein the receptacle is adapted to receive the plunger centering portion, wherein the plunger upper portion has an outer wall, the outer wall including vertical outer wall features, and wherein the plunger upper portion is configured to be fitted to a mating component of a liquid handling instrument, and wherein the fluid channel is adapted to receive the distal tip portion of the plunger tip; and a zero-insertion force pipette tip clamping mechanism adapted to manipulate the pipette tip and pipette plunger.

15. The liquid handling system of claim 14, wherein the zero-insertion force pipette clamping mechanism includes a pipette tip collet and a pipette tip lock mechanism.

16. The liquid handling system of claim 15, wherein the pipette tip collet includes a pipette tip collet upper ring plate and collet chuck portion for fitting inside the interface portion of the pipette tip.

17. The liquid handling system of claim 16, wherein the collet chuck portion has a serrated feature adapted to increase the friction to the interface portion of the pipette tip.

18. The liquid handling system of claim 17, wherein the collet chuck portion is a segmented band or sleeve for fitting inside the interface portion.

19. The liquid handling system of claim 18, wherein the collet chuck portion is adapted to expand and lock against the inner wall of the interface portion.

20. The liquid handling system of claim 15, wherein the pipette tip lock mechanism includes a pipette tip lock upper ring plate and a hollow sleeve portion for fitting inside the collet chuck portion.

21. The liquid handling system of claim 20, wherein the collet chuck portion is adapted to expand against the inside wall of the interface portion when the hollow sleeve portion is fitted inside the collet chuck portion of the pipette tip collect, and
wherein the collet chuck portion is adapted to retract and become loose with respect to the interface portion when the hollow sleeve portion is withdrawn from the collect chuck portion of the pipette tip collet.

22. The liquid handling system of claim 14, wherein the zero-insertion force pipette clamping mechanism includes a pipette plunger collet and a pipette plunger lock mechanism.

23. The liquid handling system of claim 22, wherein the pipette plunger collet has a shaft portion and a collet chuck portion for fitting around the plunger upper portion of the pipette plunger.

24. The liquid handling system of claim 23, wherein the collet chuck portion is a segmented band or sleeve for fitting around the plunger upper portion of the pipette plunger, the collet chuck portion being adapted to expand and lock against the outside wall of the plunger upper portion that is inside the collet chuck portion.

25. The liquid handling system of claim 24, wherein the pipette plunger lock mechanism includes an upper ring plate and a hollow sleeve portion for fitting around the plunger collet.

26. The liquid handling system of claim 25, wherein the collet chuck portion is adapted to be closed against the plunger upper portion of the pipette plunger when the hollow sleeve portion is slid around the collet chuck portion of the plunger collect, and
wherein the collect chuck portion is adapted to release the plunger upper portion of the pipette plunger when the hollow sleeve portion is withdrawn from the collect chuck portion of the plunger collet.

27. The liquid handling system of claim 14, wherein the zero-insertion force pipette clamping mechanism includes a pair of pipette plunger clamping mechanisms, a pair pipette plunger collets, a fixed upper plate, a lower plate, and two springs between the upper plate and the lower plate,
wherein the upper ends of the pipette plunger collets are held fixed to the upper plate,
wherein the lower plate and two springs are movable with respect to the upper plate, and
wherein each spring is adapted to provide spring force to a corresponding pipette plunger lock mechanism that passes in slidable fashion through the lower plate, the pipette plunger lock mechanisms are moveable with respect to the plunger collets.

* * * * *